US012415355B2

(12) United States Patent
Nishimura et al.

(10) Patent No.: US 12,415,355 B2
(45) Date of Patent: Sep. 16, 2025

(54) PRINTHEAD DESIGN WITH MULTIPLE FLUID PATHS TO JETTING CHANNELS

(71) Applicants: Hiroshi Nishimura, West Hills, CA (US); Giang Vo, Simi Valley, CA (US); Cesar Hurtado, Simi Valley, CA (US)

(72) Inventors: Hiroshi Nishimura, West Hills, CA (US); Giang Vo, Simi Valley, CA (US); Cesar Hurtado, Simi Valley, CA (US)

(73) Assignee: Ricoh Company, Ltd., Tokyo (JP)

( * ) Notice: Subject to any disclaimer, the term of this patent is extended or adjusted under 35 U.S.C. 154(b) by 177 days.

(21) Appl. No.: 18/372,772

(22) Filed: Sep. 26, 2023

(65) Prior Publication Data

US 2024/0009998 A1 Jan. 11, 2024

Related U.S. Application Data

(63) Continuation of application No. 17/669,350, filed on Feb. 10, 2022, now Pat. No. 11,801,677.

(51) Int. Cl.
*B41J 2/14* (2006.01)

(52) U.S. Cl.
CPC .. *B41J 2/14233* (2013.01); *B41J 2002/14306* (2013.01); *B41J 2002/14419* (2013.01)

(58) Field of Classification Search
CPC .......... B41J 2/14233; B41J 2002/14306; B41J 2002/14419; B41J 2002/14362; B41J 2002/14403; B41J 2002/14467; B41J 2202/12; B41J 2/14274; B41J 2202/20
See application file for complete search history.

(56) References Cited

U.S. PATENT DOCUMENTS

2020/0290351 A1* 9/2020 Nishimura ............. B41J 2/1433
2020/0307203 A1* 10/2020 Katayama ................ B41J 2/175

* cited by examiner

*Primary Examiner* — Lisa Solomon
(74) *Attorney, Agent, or Firm* — Duft & Bornsen, PC

(57) ABSTRACT

Printheads and design of printheads. In one embodiment, a printhead comprises a plurality of jetting channels, and a manifold apparatus fluidly coupled to the jetting channels. For each jetting channel, the printhead includes a first fluid path between the jetting channel and the manifold apparatus, and a second fluid path between the jetting channel and the manifold apparatus. The jetting channel is configured to jet a print fluid via pressure waves generated in a pressure chamber of the jetting channel. Lengths of the first fluid path and the second fluid path are different by a threshold length so that an arrival time of the pressure waves at the manifold apparatus are different by a threshold time.

21 Claims, 26 Drawing Sheets

PRINTHEAD DESIGN WITH MULTIPLE FLUID PATHS TO JETTING CHANNELS

RELATED APPLICATIONS

This non-provisional patent application is a continuation of U.S. patent application Ser. No. 17/669,350 filed on Feb. 10, 2022, which is incorporated herein by reference.

TECHNICAL FIELD

The following disclosure relates to the field of image formation, and in particular, to printheads and the design of printheads.

BACKGROUND

Image formation is a procedure whereby a digital image is recreated by propelling droplets of ink or another type of print fluid onto a medium, such as paper, plastic, a substrate for 3D printing, etc. Image formation is commonly employed in apparatuses, such as printers (e.g., inkjet printer), facsimile machines, copying machines, plotting machines, multifunction peripherals, etc. The core of a typical jetting apparatus or image forming apparatus is one or more liquid-droplet ejection heads (referred to generally herein as "printheads") having nozzles that discharge liquid droplets, a mechanism for moving the printhead and/or the medium in relation to one another, and a controller that controls how liquid is discharged from the individual nozzles of the printhead onto the medium in the form of pixels.

A typical printhead includes a plurality of nozzles aligned in one or more rows along a discharge surface of the printhead. Each nozzle is part of a "jetting channel", which includes the nozzle, a pressure chamber, and a diaphragm that vibrates in response to an actuator, such as a piezoelectric actuator. A printhead also includes a driver circuit that controls when each individual jetting channel fires based on image or print data. To jet from a jetting channel, the driver circuit provides a jetting pulse to the actuator, which causes the actuator to deform a wall of the pressure chamber (i.e., the diaphragm). The deformation of the pressure chamber creates pressure waves within the pressure chamber that eject a droplet of print fluid (e.g., ink) out of the nozzle.

Multiple jetting channels within a printhead are fluidly coupled to a common fluid path that conveys the print fluid, which is referred to as a manifold. One problem encountered within printheads is that pressure waves may escape from the jetting channels, and propagate along the manifold. The pressure waves in the manifold can affect jetting in individual jetting channels, which can result in jetting instability.

SUMMARY

Embodiments described herein provide for printheads and the design of printheads having multiple fluid paths between a manifold apparatus and jetting channels. The pressure waves that escape from the jetting channels propagate back towards the manifold apparatus along the different fluid paths. The fluid paths are designed so that there is a difference between the lengths of the fluid paths by a threshold length so that the arrival time of the pressure waves at the manifold apparatus is different by a threshold time. One advantage is that the pressure waves arriving at different times can at least partially cancel each other out within the manifold apparatus. This can result in improved jetting consistency and performance.

One embodiment comprises a printhead comprising a plurality of jetting channels, and a manifold apparatus fluidly coupled to the jetting channels. For each jetting channel of the plurality, the printhead includes a first fluid path between the jetting channel and the manifold apparatus, and a second fluid path between the jetting channel and the manifold apparatus. The jetting channel is configured to jet a print fluid via pressure waves generated in a pressure chamber of the jetting channel. Lengths of the first fluid path and the second fluid path are different by a threshold length so that an arrival time of the pressure waves at the manifold apparatus are different by a threshold time.

One embodiment comprises a method of operating a printhead comprising a plurality of jetting channels configured to jet a print fluid. For each jetting channel of the plurality, the method comprises conveying the print fluid between a manifold apparatus and the jetting channel over a first fluid path, conveying the print fluid between the manifold apparatus and the jetting channel over a second fluid path, generating pressure waves in a pressure chamber of the jetting channel that propagate along the first fluid path and the second fluid path, and producing a difference in arrival time of the pressure waves at the manifold apparatus by a threshold time due to a difference in length between the first fluid path and the second fluid path by a threshold length.

One embodiment comprises a design tool for a printhead comprising a plurality of jetting channels configured to jet a print fluid, and a manifold apparatus fluidly coupled to the jetting channels. The design tool comprises at least one processor and memory, and the processor causes the design tool to design a first fluid path between the manifold apparatus and a jetting channel having a pressure chamber configured to jet based on pressure waves, design a second fluid path between the manifold apparatus and the jetting channel, and select a target difference in arrival time of the pressure waves that propagate along the first fluid path and arrive at the manifold apparatus, and the pressure waves that propagate along the second fluid path and arrive at the manifold apparatus. The processor further causes the design tool to select a difference in length between the first fluid path and the second fluid path by a threshold length that causes the target difference in arrival time of the pressure waves at the manifold apparatus, and configure the first fluid path and the second fluid path for the jetting channels based on the threshold length.

One embodiment comprises a method of operating a printhead in non-circulation mode, where the printhead comprises a plurality of jetting channels configured to jet a print fluid. For each jetting channel of the plurality, the method comprises conveying the print fluid from a manifold to the jetting channel over a first fluid path, conveying the print fluid from the manifold to the jetting channel over a second fluid path, generating pressure waves in a pressure chamber of the jetting channel that propagate along the first fluid path and the second fluid path, and producing a difference in arrival time of the pressure waves at the manifold by a threshold time due to a difference in length between the first fluid path and the second fluid path by a threshold length.

One embodiment comprises a method of operating a printhead in circulation mode, where the printhead comprises a plurality of jetting channels configured to jet a print fluid. For each jetting channel of the plurality, the method comprises conveying the print fluid from a first manifold to the jetting channel over a first fluid path, conveying non-jetted print fluid from the jetting channel to a second manifold over a second fluid path, generating pressure waves in a pressure chamber of the jetting channel that propagate along the first fluid path and the second fluid path, and producing a difference in arrival time of the pressure waves at the first manifold and at the second manifold by a threshold time due to a difference in length between the first fluid path and the second fluid path by a threshold length.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the present disclosure are now described, by way of example only, and with reference to the accompanying drawings. The same reference number represents the same element or the same type of element on all drawings.

DETAILED DESCRIPTION

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
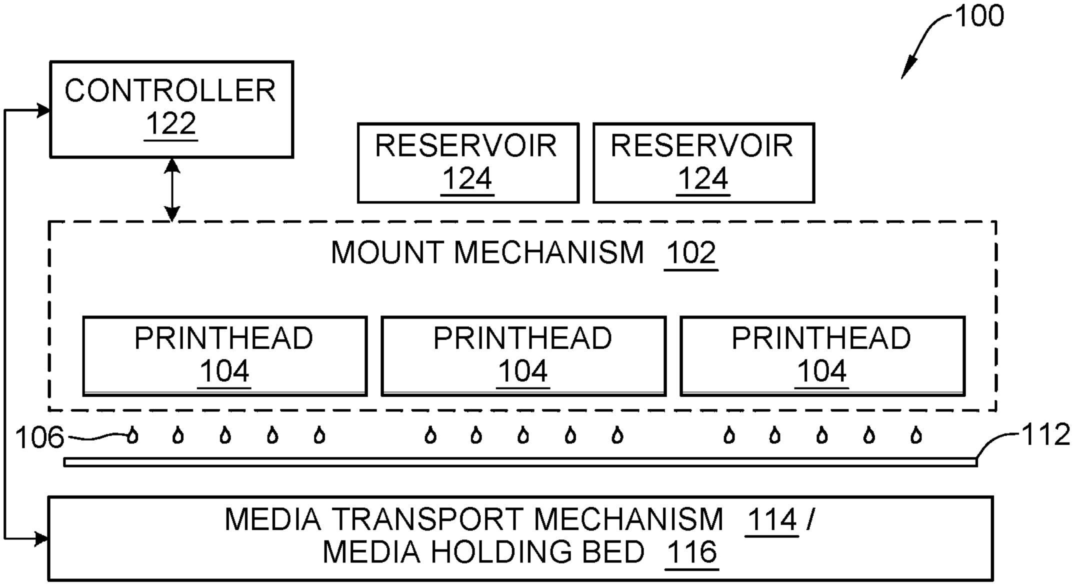
FIG. 1 is a schematic diagram of a jetting apparatus in an illustrative embodiment.

FIG. 1 is a schematic diagram of a jetting apparatus 100 in an illustrative embodiment. A jetting apparatus 100 is a device or system that uses one or more printheads to eject a print fluid or marking material onto a medium. One example of jetting apparatus 100 is an inkjet printer (e.g., a cut-sheet or continuous-feed printer) that performs single-pass printing. Other examples of jetting apparatus 100 include a scan pass inkjet printer (e.g., a wide format printer), a multifunction printer, a desktop printer, an industrial printer, a 3D printer, etc. Generally, jetting apparatus 100 includes a mount mechanism 102 that supports one or more printheads 104 in relation to a medium 112. Mount mechanism 102 may be fixed within jetting apparatus 100 for single-pass printing. Alternatively, mount mechanism 102 may be disposed on a carriage assembly that reciprocates back and forth along a scan line or sub-scan direction for multi-pass printing. Printheads 104 are a device, apparatus, or component configured to eject droplets 106 of a print fluid, such as ink (e.g., water, solvent, oil, or UV-curable), through a plurality of nozzles (not visible in FIG. 1). The droplets 106 ejected from the nozzles of printheads 104 are directed toward medium 112. Medium 112 comprises any type of material upon which ink or another marking material is applied by a printhead, such as paper, plastic, card stock, transparent sheets, a substrate for 3D printing, cloth, etc. Typically, nozzles of printheads 104 are arranged in one or more rows so that ejection of a print fluid from the nozzles causes formation of characters, symbols, images, layers of an object, etc., on medium 112 as printhead 104 and/or medium 112 are moved relative to one another. Jetting apparatus 100 may include a media transport mechanism 114 or a media holding bed 116. Media transport mechanism 114 is configured to move medium 112 relative to printheads 104. Media holding bed 116 is configured to support medium 112 in a stationary position while the printheads 104 move in relation to medium 112.

Jetting apparatus 100 also includes a jetting apparatus controller 122 that controls the overall operation of jetting apparatus 100. Jetting apparatus controller 122 may connect to a data source to receive print data, image data, or the like, and control each printhead 104 to discharge the print fluid on medium 112. Jetting apparatus 100 also includes one or more reservoirs 124 for a print fluid or multiple types of print fluid. Although not shown in FIG. 1, reservoirs 124 are fluidly coupled to printheads 104, such as with hoses or the like.

Figure 2:
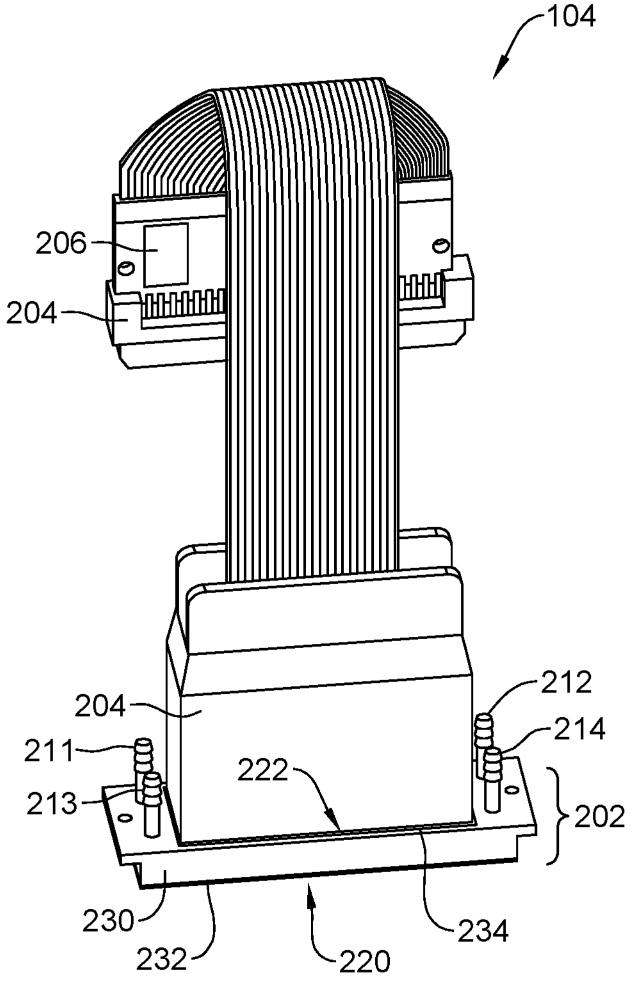
FIG. 2 is a perspective view of a printhead in an illustrative embodiment.

FIG. 2 is a perspective view of a printhead 104 in an illustrative embodiment. In this embodiment, printhead 104 includes a head member 202 and electronics 204. Head member 202 is an elongated component that forms the jetting channels of printhead 104. A typical jetting channel includes a nozzle, a pressure chamber, and a diaphragm that is driven by an actuator, such as a piezoelectric actuator. Electronics 204 control how the nozzles of printhead 104 jet droplets in response to data signals and control signals received from another controller (e.g., jetting apparatus controller 122). Electronics 204 include an embedded printhead controller 206 or driver circuits configured to drive individual jetting channels based on the data signals and control signals. The bottom surface of head member 202 in FIG. 2 includes the nozzles of the jetting channels, and represents the discharge surface 220 of printhead 104. The top surface of head member 202 in FIG. 2 (referred to as I/O surface 222) represents the Input/Output (I/O) portion for receiving one or more print fluids into printhead 104, and/or conveying print fluids (e.g., fluids that are not jetted) out of printhead 104. I/O surface 222 includes a plurality of I/O ports 211-214. An I/O port 211-214 may comprise an inlet I/O port, which is an opening in head member 202 that acts as an entry point for a print fluid. An I/O port 211-214 may comprise an outlet I/O port, which is an opening in head member 202 that acts as an exit point for a print fluid. I/O ports 211-214 may include a hose coupling, hose barb, etc., for coupling with a hose of a reservoir, a cartridge, or the like. The number of I/O ports 211-214 is provided as an example, as printhead 104 may include other numbers of I/O ports.

Head member 202 includes a housing 230 and a plate stack 232. Housing 230 is a rigid member made from stainless steel or another type of material. Housing 230 includes an access hole 234 that provides a passageway for electronics 204 to pass through housing 230 so that actuators may interface with (i.e., come into contact with) diaphragms of the jetting channels. Plate stack 232 attaches to an interface surface (not visible) of housing 230. Plate stack 232 (also referred to as a laminate plate stack) is a series of plates that are fixed or bonded to one another to form a laminated stack. Plate stack 232 may include the following plates: one or more nozzle plates, one or more chamber plates, restrictor plates, and a diaphragm plate. A nozzle plate includes a plurality of nozzles that are arranged in one or more rows (e.g., two rows, four rows, etc.). A chamber plate includes a plurality of openings that form the pressure chambers of the jetting channels. A restrictor plate includes a plurality of restrictors that fluidly connect the pressure chambers of the jetting channels with a manifold. A diaphragm plate is a sheet of a semi-flexible material that vibrates in response to actuation by an actuator (e.g., piezoelectric actuator). The embodiment in FIG. 2 illustrates one particular configuration of a printhead 104, and it is understood that other printhead configurations are considered herein that have a plurality of jetting channels.

Figure 3:
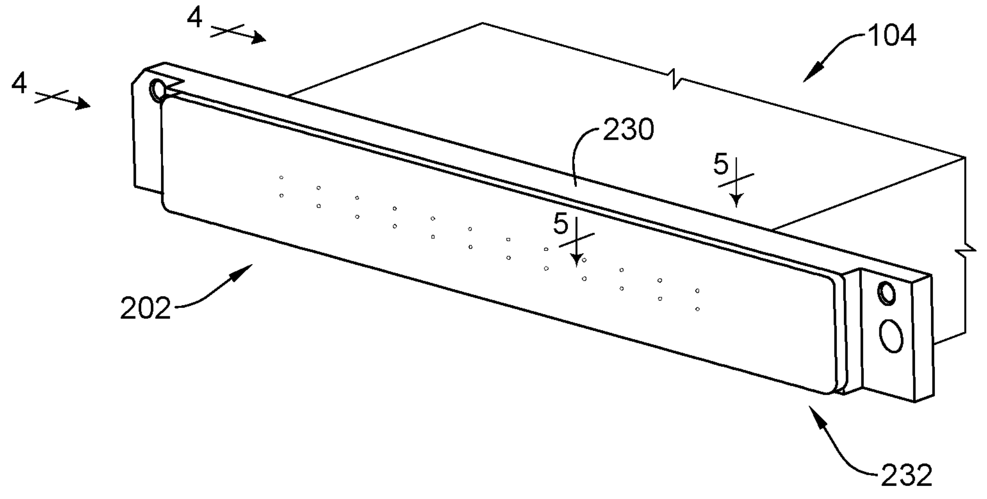
FIG. 3 is a perspective view of a printhead in an illustrative embodiment.
Figure 4:
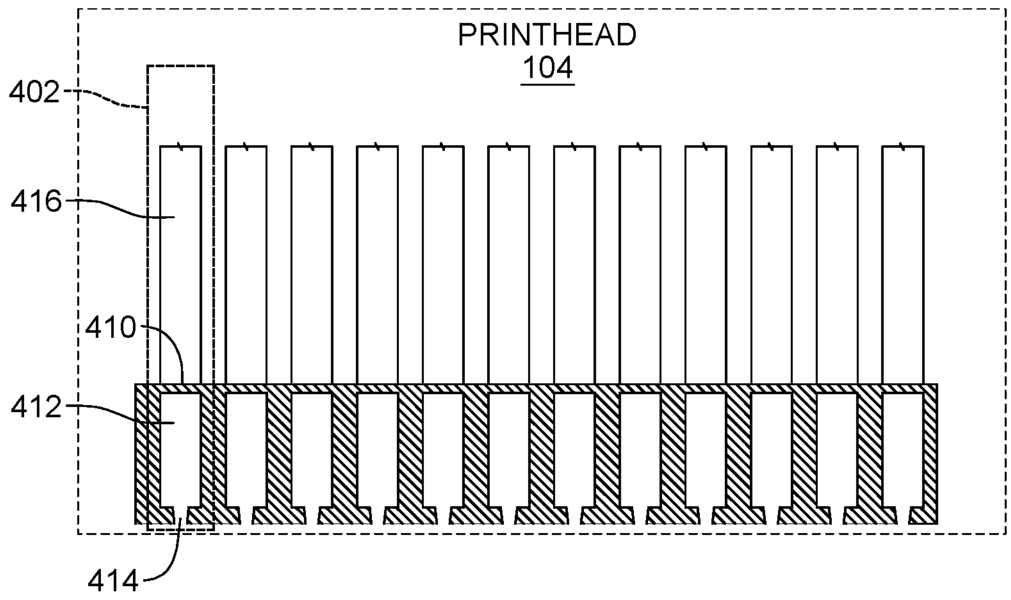
FIG. 4 is a cross-sectional view of a printhead in an illustrative embodiment.

FIG. 3 is a perspective view of printhead 104 in an illustrative embodiment. In FIG. 3, plate stack 232 is attached or affixed to housing 230. FIG. 4 is a cross-sectional view of printhead 104 in an illustrative embodiment. FIG. 4 shows a cross-section of a portion of row of jetting channels 402 along cut-plane 4-4 in FIG. 3. A jetting channel 402 is a structural element within printhead 104 that jets or ejects a print fluid. Each jetting channel 402 includes a diaphragm 410, a pressure chamber 412, and a nozzle 414. An actuator 416 contacts diaphragm 410 to control jetting from a jetting channel 402. Jetting channels 402 may be formed in one or more rows along a length of printhead 104, and each jetting channel 402 may have a similar configuration as shown in FIG. 4.

Figure 5:
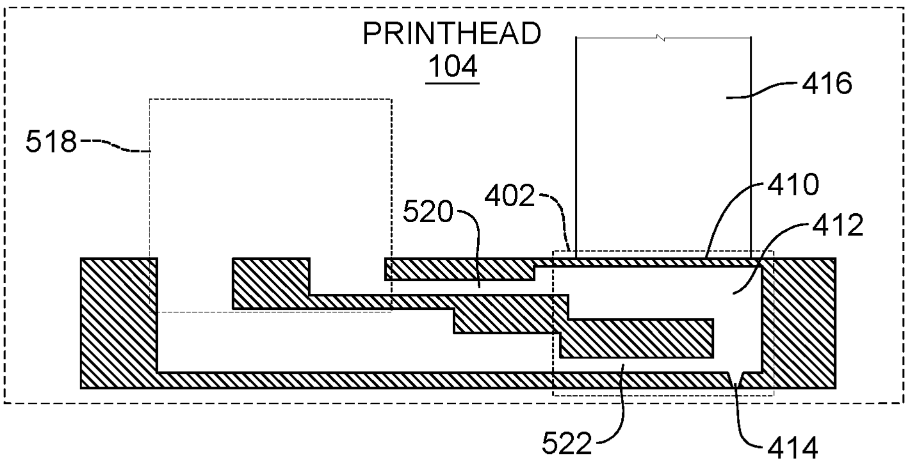
FIG. 5 is another cross-sectional view of a portion of a printhead in an illustrative embodiment.

FIG. 5 is another cross-sectional view of a portion of printhead 104 in an illustrative embodiment. FIG. 5 shows a cross-section of printhead 104 along cut-plane 5-5 in FIG. 3. As in FIG. 4, jetting channel 402 includes diaphragm 410, pressure chamber 412, and nozzle 414. A manifold apparatus 518 (also referred to as a manifold assembly) of printhead 104 is fluidly coupled to jetting channel 402 to supply a print fluid to jetting channel 402 (and other jetting channels 402 of printhead 104 configured to jet the same type of print fluid), and/or to receive non-jetted print fluid from jetting channel 402. Pressure chamber 412 is fluidly coupled to manifold apparatus 518 through a restrictor 520 (which may also be referred to as a first restrictor, a top restrictor, etc.). Restrictor 520 controls a flow of print fluid between manifold apparatus 518 and pressure chamber 412 along one fluid path. In this embodiment, pressure chamber 412 is also fluidly coupled to manifold apparatus 518 through another restrictor 522. Restrictor 522 controls a flow of print fluid between manifold apparatus 518 and pressure chamber 412 along another fluid path. One wall of pressure chamber 412 is formed with diaphragm 410 that physically interfaces with actuator 416. Diaphragm 410 may comprise a sheet of semi-flexible material that vibrates in response to actuation by actuator 416. The print fluid flows through pressure chamber 412 and out of nozzle 414 in the form of a droplet in response to actuation by actuator 416. Actuator 416 is configured to receive a jetting pulse, and to actuate or "fire" in response to the jetting pulse. Firing of actuator 416 in jetting channel 402 creates pressure waves in pressure chamber 412 that cause jetting of a droplet from nozzle 414.

A jetting channel 402 as shown in FIGS. 4-5 are examples to illustrate a basic structure of a jetting channel, such as the diaphragm, pressure chamber, and nozzle. Other types of jetting channels are also considered herein. For example, some jetting channels may have a pressure chamber having a different shape than is illustrated in FIGS. 4-5. Also, the position of a manifold apparatus 518, restrictors 520/522, diaphragm 410, etc., may differ in other embodiments.

Figure 6:
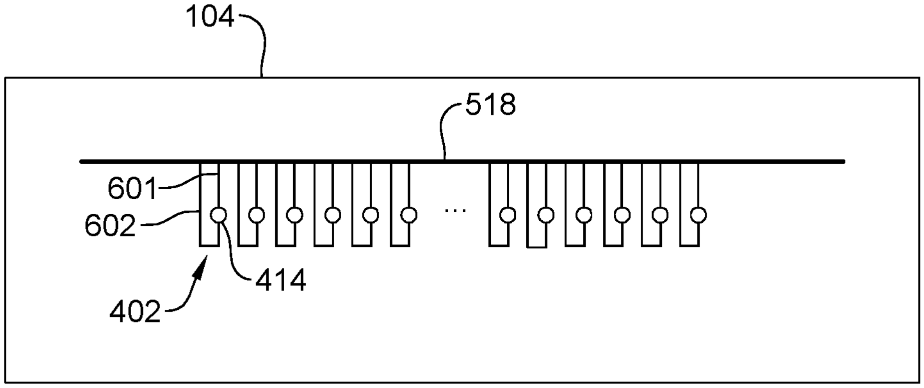
FIG. 6 is a schematic diagram of a printhead in an illustrative embodiment.

FIG. 6 is a schematic diagram of a printhead 104 in an illustrative embodiment. A plurality of jetting channels 402 of printhead 104 is schematically illustrated in FIG. 6 as a row of nozzles 414 fluidly coupled to manifold apparatus 518. As will be described in more detail below, a manifold apparatus 518 may comprise one or more manifolds. A manifold is a conduit or channel internal to printhead 104 (i.e., within the main body or housing 230 of printhead 104) that provides a common fluid pathway for a plurality of jetting channels 402. For each of the jetting channels 402 illustrated, there is a first fluid path 601 (also referred to as fluid conduit, fluid channel, etc.) between the jetting channel 402 and manifold apparatus 518, and a second fluid path 602 between the jetting channel 402 and the manifold apparatus 518. In the embodiment shown in FIG. 5, for example, the first fluid path 601 between jetting channel 402 and manifold apparatus 518 may be through restrictor 520, which controls the flow of print fluid along the first fluid path 601. Further, the second fluid path 602 between jetting channel 402 and manifold apparatus 518 may be through restrictor 522, which controls the flow of print fluid along the second fluid path 602. Thus, the first fluid path 601 and the second fluid path 602 represent distinct pathways for the print fluid to flow between pressure chamber 412 and manifold apparatus 518.

Figure 7:
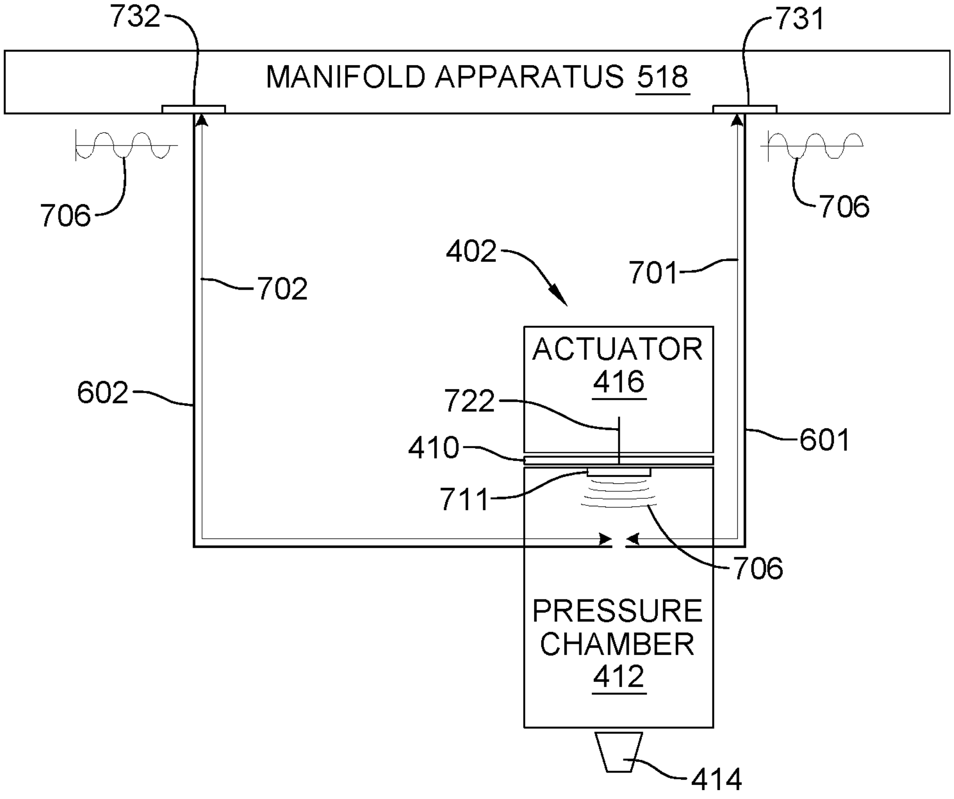
FIG. 7 is a schematic diagram of a manifold apparatus and a jetting channel in an illustrative embodiment.

FIG. 7 is a schematic diagram of manifold apparatus 518 and a jetting channel 402 in an illustrative embodiment. FIG. 7 shows the first fluid path 601 between jetting channel 402 and manifold apparatus 518, and the second fluid path 602 between jetting channel 402 and manifold apparatus 518. The first fluid path 601 has a length 701, and the second fluid path 602 has a length 702. In this embodiment, the length 701 of the first fluid path 601 is different than the length 702 of the second fluid path 602 by a threshold length (e.g., millimeters). When actuator 416 fires in response to a jetting pulse, pressure waves 706 are created in pressure chamber 412 that cause jetting of a droplet from nozzle 414. These pressure waves 706 may escape pressure chamber 412 and propagate along the first fluid path 601 and the second fluid path 602 toward manifold apparatus 518. The pressure waves 706 are initially in-phase when escaping the pressure chamber 412. The length 701 of the first fluid path 601 is different than the length 702 of the second fluid path 602 by the threshold length so that the arrival time of pressure waves 706 at manifold apparatus 518 are not equal and are different by a threshold time (e.g., milliseconds). Thus, the pressure waves 706 propagated along the first fluid path 601 are out-of-phase with the pressure waves 706 propagated along the second fluid path 602 when received at manifold apparatus 518. One technical benefit is when the pressure waves 706 pass through each other or interfere within manifold apparatus 518, the pressure waves 706 interfere destructively. As described in the background, the pressure waves 706 that escape from the jetting channels 402 can propagate along manifold apparatus 518, which can affect jetting in individual jetting channels 402. If the pressure waves 706 escaping along the first fluid path 601 and the second fluid path 602 were in-phase when received at manifold apparatus 518, then constructive interference would occur within manifold apparatus 518 and the resultant wave would have an amplitude comprising the sum of the maxima of the pressure waves 706 traveling along the first fluid path 601 and the second fluid path 602. However, when the arrival time of pressure waves 706 at manifold apparatus 518 are different by the threshold time, the pressure waves 706 interfere destructively and the resultant wave has a reduced amplitude.

In one embodiment, the length 701 of the first fluid path 601 is from an origin 711 of the pressure waves 706 to an opening 731 of manifold apparatus 518. The origin 711 of the pressure waves 706 may be the center 722 of actuator 416, the center 722 of diaphragm 410 within jetting channel 402, etc. Similarly, the length 702 of the second fluid path 602 is from the origin 711 of the pressure waves 706 to an opening 732 of manifold apparatus 518. In one embodiment, the threshold length and/or threshold time may be based on a resonant frequency of the jetting channel 402. When actuator 416 displaces in response to a jetting pulse, the pressure waves 706 will resonate or absorb at a characteristic frequency. This characteristic frequency is determined by the geometry of pressure chamber 412 (and other structures of a jetting channel 402) and their associated fluidic properties, and is referred to as the resonant frequency or Helmholtz frequency of a jetting channel 402. The difference in length of the first fluid path 601 and the second fluid path 602 by the threshold length causes a difference in arrival time of the pressure waves 706 at manifold apparatus 518 by the threshold time. In one embodiment, the threshold time and/or threshold length is based on the resonant frequency or Helmholtz frequency of the jetting channels 402. For example, the threshold time may be a half resonant cycle (e.g., 0.5) or half Helmholtz cycle of the jetting channels 402, or a multiple of the half resonant cycle (e.g., 1.5, 2.5, 3.5, etc.). When the threshold time is a half resonant cycle or a multiple of the half resonant cycle, the pressure waves 706 escaping along the first fluid path 601 and the second fluid path 602 would be approximately 180° out-of-phase when they interfere within manifold apparatus 518. Thus, destructive interference would occur within manifold apparatus 518 and the resultant wave would have little or no amplitude. However, a phase difference other than 180° out-of-phase still results in the pressure waves 706 interfering destructively so that the resultant wave has a reduced amplitude.

In one embodiment, other differences in the features of the first fluid path 601 and the second fluid path 602 may affect the arrival time of pressure waves 706 at manifold apparatus 518, which are considered herein. For example, material properties of printhead 104 that form the first fluid path 601 and the second fluid path 602 may be different. The volume of the first fluid path 601 and the second fluid path 602 along their respective lengths may be different. Steps or variations along the lengths of the first fluid path 601 and the second fluid path 602 may be different. One or more combinations of these and other features may further affect the arrival time of pressure waves 706 at manifold apparatus 518.

Figure 8:
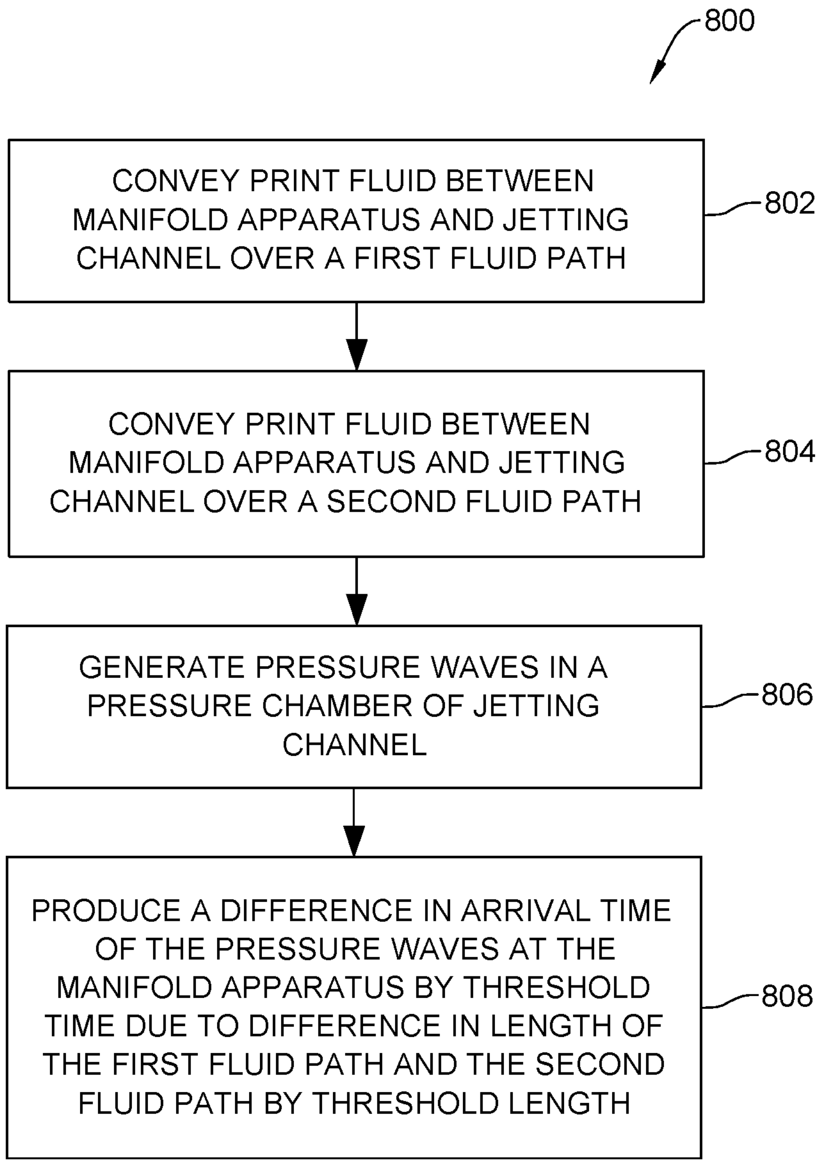
FIG. 8 is a flow chart illustrating a method of operating a printhead in an illustrative embodiment.

FIG. 8 is a flow chart illustrating a method 800 of operating printhead 104 in an illustrative embodiment. The steps of method 800 will be described with reference to printhead 104 in FIGS. 4-7, but those skilled in the art will appreciate that method 800 may be performed by other printheads. Also, the steps of the flow charts described herein are not all inclusive and may include other steps not shown, and the steps may be performed in an alternative order.

For method 800, it is assumed that printhead 104 includes a plurality of jetting channels 402 fluidly coupled to a manifold apparatus 518. For each jetting channel 402, a print fluid is conveyed between manifold apparatus 518 and the jetting channel 402 over a first fluid path 601 (step 802), and the print fluid is conveyed between manifold apparatus 518 and the jetting channel 402 over a second fluid path 602 (step 804). Pressure waves 706 are generated in a pressure chamber 412 of the jetting channel 402 (step 806), such as due to actuation of an actuator 416, to jet droplets of the print fluid from a nozzle 414 of the jetting channel 402. The pressure waves 706 generated in the pressure chamber 412 propagate along the first fluid path 601 to manifold apparatus 518, and propagate along the second fluid path 602 to manifold apparatus 518. The design of printhead 104 produces, creates, or generates a difference in arrival time of pressure waves 706 at manifold apparatus 518 (i.e., by a threshold time) due to the difference in length 701 of the first fluid path 601 and length 702 of the second fluid path 602 by the threshold length (step 808). Thus, the pressure waves 706 that arrive at manifold apparatus 518 over the first fluid path 601 and over the second fluid path 602 interfere destructively within manifold apparatus 518.

Figure 9:
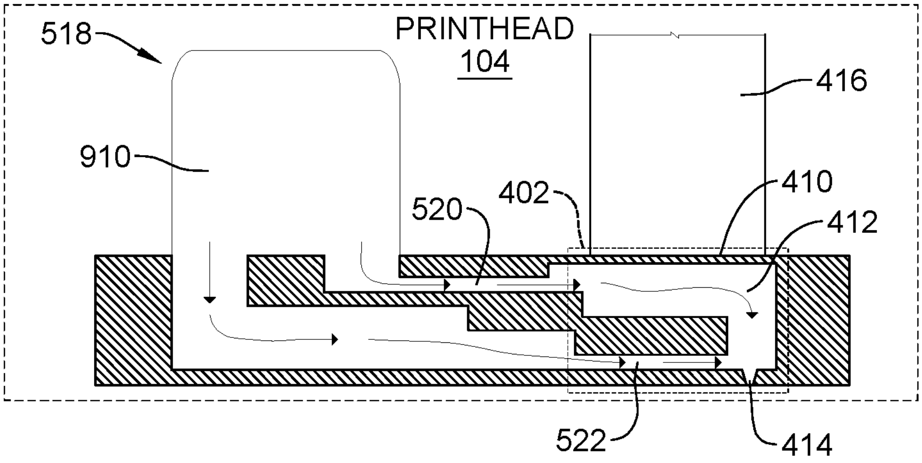
FIG. 9 is a cross-sectional view of a portion of a printhead in an illustrative embodiment.

FIGS. 9-12 disclose a printhead 104 in non-circulation mode in one embodiment. In non-circulation mode, print fluid is supplied to a jetting channel 402 through the first fluid path 601 and the second fluid path 602. FIG. 9 is a cross-sectional view of a portion of printhead 104 in an illustrative embodiment. FIG. 9 shows a cross-section of printhead 104 along cut-plane 5-5 in FIG. 3. In this embodiment, manifold apparatus 518 comprises a manifold 910 that acts as a common fluid supply for a plurality of jetting channels 402. Pressure chamber 412 is fluidly coupled to manifold 910 through restrictor 520, which controls a flow of print fluid from manifold 910 to pressure chamber 412 along one fluid path. Pressure chamber 412 is also fluidly coupled to manifold 910 through restrictor 522, which controls a flow of print fluid from manifold 910 to pressure chamber 412 along another fluid path.

The arrows in FIG. 9 illustrate a flow of a print fluid from manifold 910 to jetting channel 402. The print fluid flows from manifold 910 and into pressure chamber 412 through restrictor 520, and also flows from manifold 910 and into pressure chamber 412 through restrictor 522. One wall of pressure chamber 412 is formed with diaphragm 410 that physically interfaces with actuator 416, and vibrates in response to actuation by actuator 416. The print fluid in pressure chamber 412 is jetted out of nozzle 414 in the form of a droplet in response to actuation by actuator 416.

Figure 10:
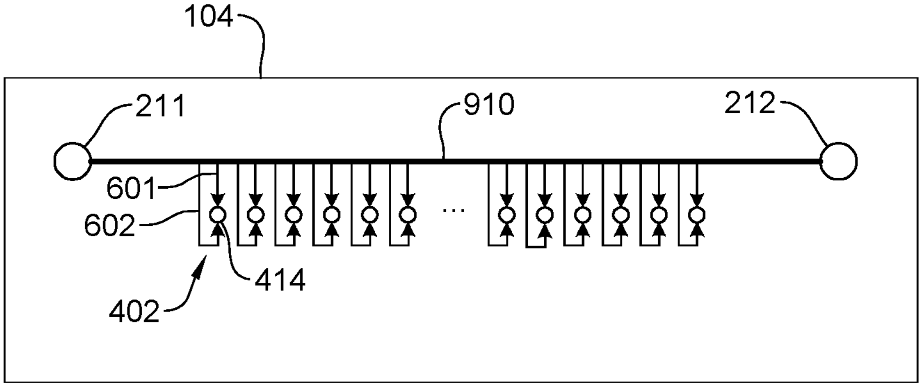
FIG. 10 is a schematic diagram of a printhead in an illustrative embodiment.

FIG. 10 is a schematic diagram of a printhead 104 in an illustrative embodiment. A plurality of jetting channels 402 of printhead 104 is schematically illustrated in FIG. 10 as a row of nozzles 414. Manifold 910 is a conduit or channel internal to printhead 104 that conveys a print fluid to the jetting channels 402. Manifold 910 is disposed between I/O ports 211-212 that define inlets of print fluid into printhead 104. Thus, when print fluid enters printhead 104 at one or both of I/O ports 211-212, the print fluid flows through manifold 910 to jetting channels 402. A manifold 910 that conveys a print fluid to jetting channels 402 may be considered as having a direct fluid coupling with the jetting channels 402, as the manifold 910 is fluidly coupled through a restrictor or similar element that controls the flow of print fluid from manifold 910 to a jetting channel 402. The major portion or section of manifold 910 is disposed longitudinally within printhead 104 to fluidly couple with the jetting channels 402. Although one manifold 910 is illustrated in FIG. 10, a printhead 104 may include more manifolds as desired.

For each of the jetting channels 402 illustrated, there is a first fluid path 601 between the jetting channel 402 and manifold 910, and a second fluid path 602 between the jetting channel 402 and manifold 910. In the embodiment shown in FIG. 9, for example, the first fluid path 601 between jetting channel 402 and manifold 910 may be through restrictor 520, which controls the flow of print fluid along the first fluid path 601. Further, the second fluid path 602 between jetting channel 402 and manifold 910 may be through restrictor 522, which controls the flow of print fluid along the second fluid path 602.

Figure 11:
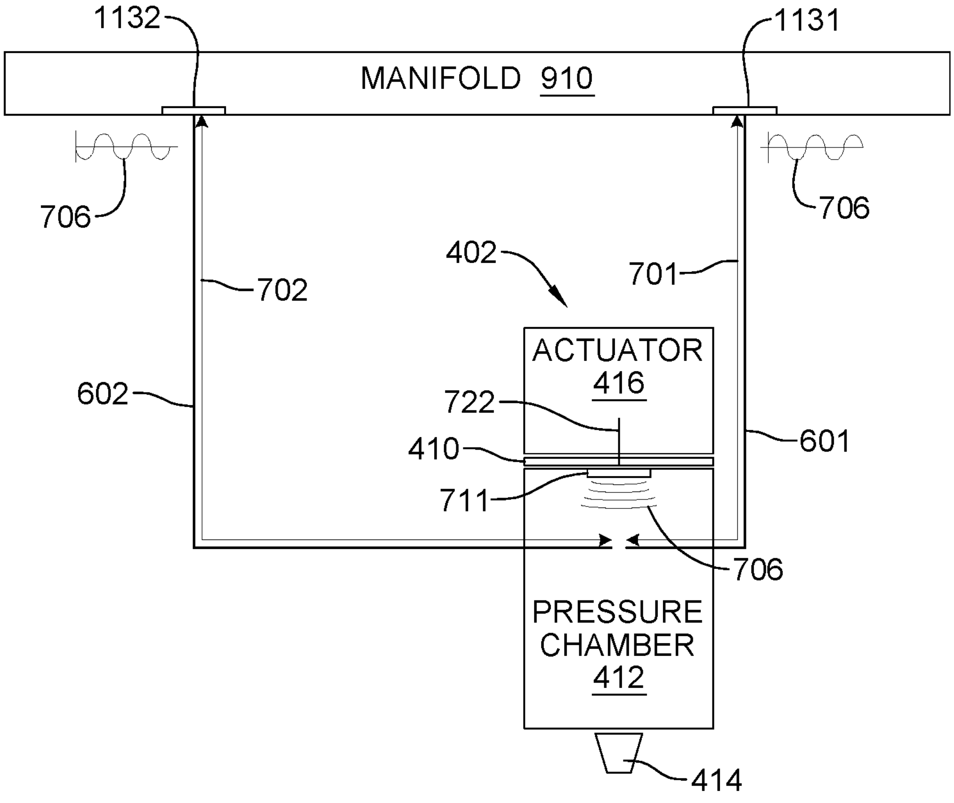
FIG. 11 is a schematic diagram of a manifold and a jetting channel in an illustrative embodiment.

FIG. 11 is a schematic diagram of manifold 910 and a jetting channel 402 in an illustrative embodiment. FIG. 11 shows the first fluid path 601 between jetting channel 402 and manifold 910, and the second fluid path 602 between jetting channel 402 and manifold 910. In one embodiment, the length 701 of the first fluid path 601 is from an origin 711 of the pressure waves 706 to an opening 1131 of manifold 910. The length 702 of the second fluid path 602 is from the origin 711 of the pressure waves 706 to an opening 1132 of manifold 910. As above, the length 701 of the first fluid path 601 is different than the length 702 of the second fluid path 602 by a threshold length. The length 701 of the first fluid path 601 is different than the length 702 of the second fluid path 602 by the threshold length so that the arrival time of pressure waves 706 at manifold 910 are not equal and are different by a threshold time. Thus, when the pressure waves 706 pass through each other or interfere within manifold 910, the pressure waves 706 interfere destructively.

Figure 12:
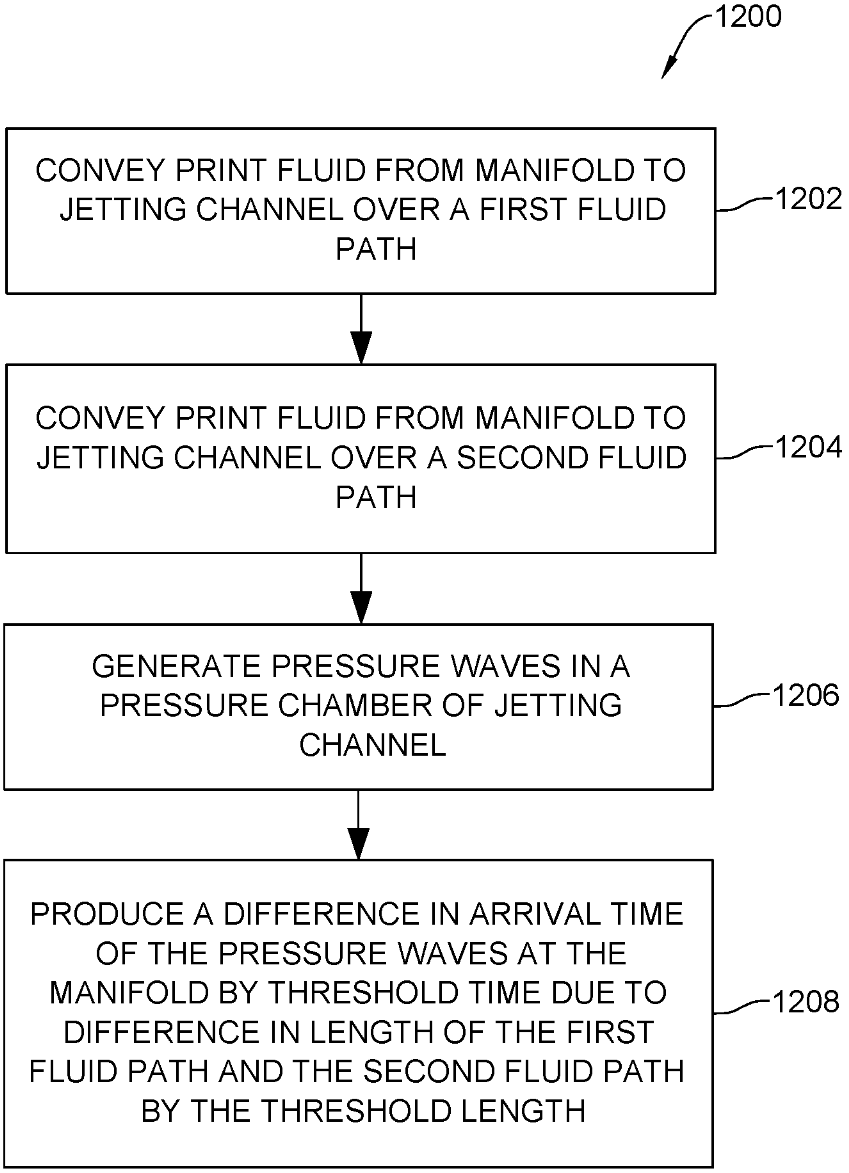
FIG. 12 is a flow chart illustrating a method of operating a printhead in non-circulation mode in an illustrative embodiment.

FIG. 12 is a flow chart illustrating a method 1200 of operating printhead 104 in non-circulation mode in an illustrative embodiment. For method 1200, it is assumed that printhead 104 includes a plurality of jetting channels 402 fluidly coupled to a manifold 910. For each jetting channel 402, a print fluid is conveyed from manifold 910 to the jetting channel 402 over a first fluid path 601 (step 1202), and the print fluid is conveyed from manifold 910 to the jetting channel 402 over a second fluid path 602 (step 1204). Pressure waves 706 are generated in a pressure chamber 412 of the jetting channel 402 (step 1206), such as due to actuation of an actuator 416, to jet droplets of the print fluid from a nozzle 414 of the jetting channel 402. The pressure waves 706 generated in the pressure chamber 412 propagate along the first fluid path 601 to manifold 910, and propagate along the second fluid path 602 to manifold 910. The design of printhead 104 produces, creates, or generates a difference in arrival time of pressure waves 706 at manifold 910 (i.e., by a threshold time) due to the difference in length 701 of the first fluid path 601 and length 702 of the second fluid path 602 by the threshold length (step 1208). Thus, the pressure waves 706 that arrive at manifold 910 over the first fluid path 601 and over the second fluid path 602 interfere destructively within manifold 910.

Figure 13:
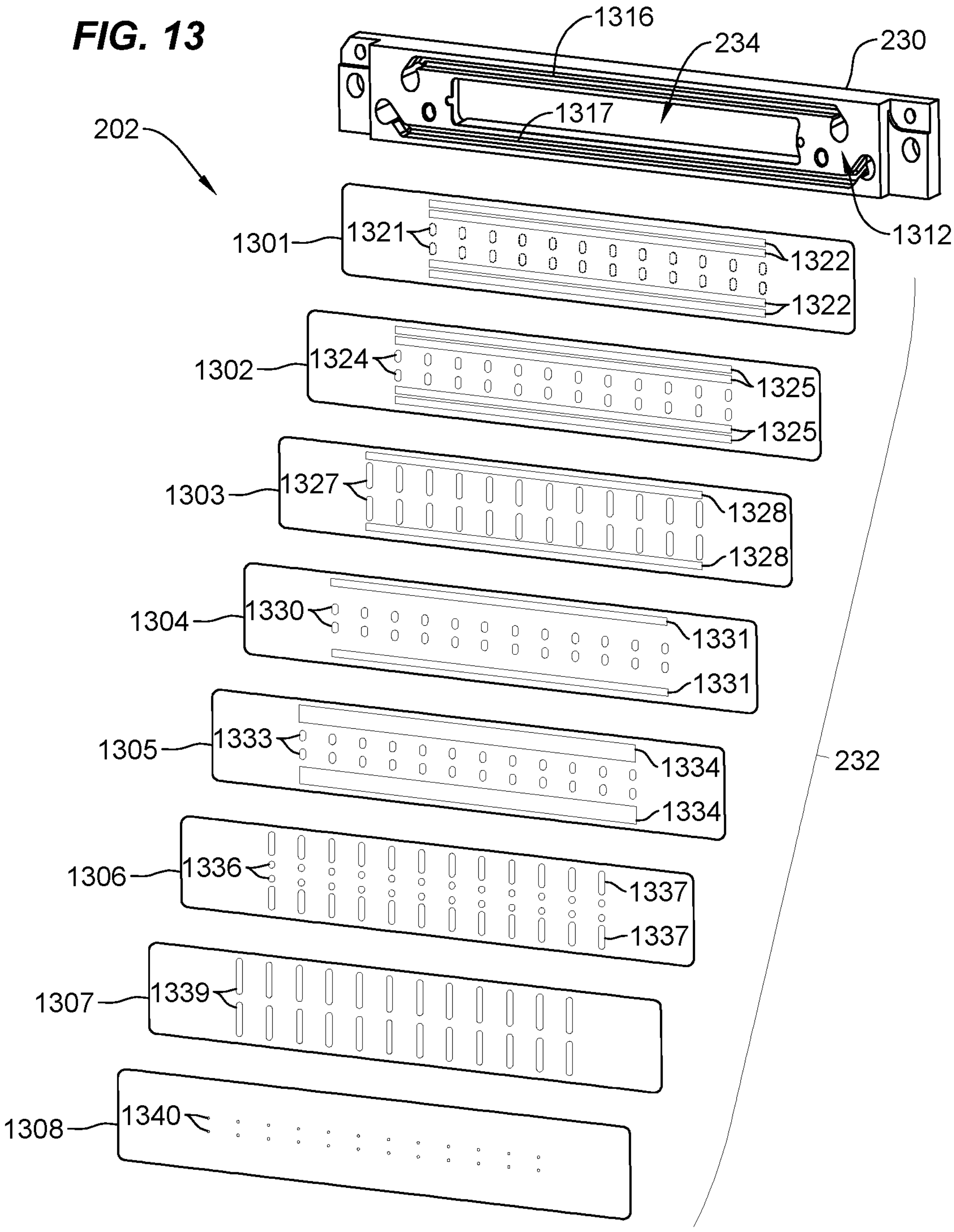
FIG. 13 illustrates an exploded, perspective view of a head member of a printhead in an illustrative embodiment.

FIG. 13 illustrates an exploded, perspective view of a head member 202 of a printhead 104 in an illustrative embodiment. In this embodiment, head member 202 is an assembly that includes housing 230 and plate stack 232. Plate stack 232 is affixed or attached to housing 230, and forms one or more rows of jetting channels 402. Housing 230 is an elongated member made from a rigid material, such as stainless steel. Housing 230 has a length (L), a width (W), and a height (H), and the dimensions of housing 230 are such that the length is greater than the width. The direction of a row of jetting channels 402 corresponds with the length of housing 230. Housing 230 includes access hole 234 at or near its center that extends from I/O surface (not visible) through to an opposing interface surface 1312. Access hole 234 provides passage way for an actuator assembly (not shown), such as a plurality of piezoelectric actuators, to pass through and contact diaphragms 410 of the jetting channels 402. Interface surface 1312 is the surface of housing 230 that faces plate stack 232, and interfaces with a plate of plate stack 232. Housing 230 also includes manifold ducts 1316-1317 that extend longitudinally along a length of interface surface 1312. A manifold duct 1316-1317 comprises an elongated cut or groove along interface surface 1312 that is configured to convey a print fluid, and forms at least a portion of a manifold for printhead 104.

Plate stack 232 includes a series of plates 1301-1308 that are fixed or bonded to one another to form a laminated plate structure. Plate stack 232 illustrated in FIG. 13 is intended to be an example of a basic structure of a printhead. There may be additional plates that are used in the plate stack 232 that are not shown in FIG. 13, and the configuration of the various plates may vary as desired. Also, FIG. 13 is not drawn to scale.

In this embodiment, plate stack 232 includes the following plates: a diaphragm plate 1301, a spacer plate 1302, a restrictor plate 1303, chamber plates 1304-1306, a restrictor plate 1307, and a nozzle plate 1308. Diaphragm plate 1301 is a thin sheet of material (e.g., metal, plastic, etc.) that is generally rectangular in shape and is substantially flat or planar. Diaphragm plate 1301 includes diaphragms 1321 comprising a sheet of a semi-flexible material that forms diaphragms 410 for the jetting channels 402. Diaphragm plate 1301 also includes manifold openings 1322, which are elongated apertures or holes that form part of a fluid path between a manifold and pressure chambers 412 of jetting channels 402. Spacer plate 1302 is a thin sheet of material that is generally rectangular in shape and is substantially flat or planar. Spacer plate 1302 includes chamber openings 1324 and manifold openings 1325. Chamber openings 1324 comprise apertures or holes that form at least part of pressure chambers 412 for jetting channels 402. Restrictor plate 1303 is a thin sheet of material that is generally rectangular in shape and is substantially flat or planar. Restrictor plate 1303 includes restrictor openings 1327 and manifold openings 1328. Restrictor openings 1327 are elongated apertures or holes transversely disposed or oriented, and are configured to fluidly couple pressure chambers 412 of jetting channels 402 with a manifold. Chamber plates 1304-1306 are thin sheets of material that are generally rectangular in shape and substantially flat or planar. Chamber plate 1304 includes chamber openings 1330 and manifold openings 1331. Chamber plate 1305 includes chamber openings 1333 and manifold openings 1334. Chamber plate 1306 includes chamber openings 1336 and manifold openings 1337. Restrictor plate 1307 is a thin sheet of material that is generally rectangular in shape and is substantially flat or planar. Restrictor plate 1307 includes restrictor openings 1339, which are elongated apertures or holes transversely disposed or oriented, and are configured to fluidly couple pressure chambers 412 of jetting channels 402 with a manifold. Nozzle plate 1308 is a thin sheet of material that is generally rectangular in shape and is substantially flat or planar. Nozzle plate 1308 includes circular apertures or holes 1340 that form nozzles 414 of the jetting channels 402. In this embodiment, nozzles 414 are arranged in two nozzle rows. However, nozzles 414 may be arranged in a single row or in more than two rows in other embodiments.

Figure 14:
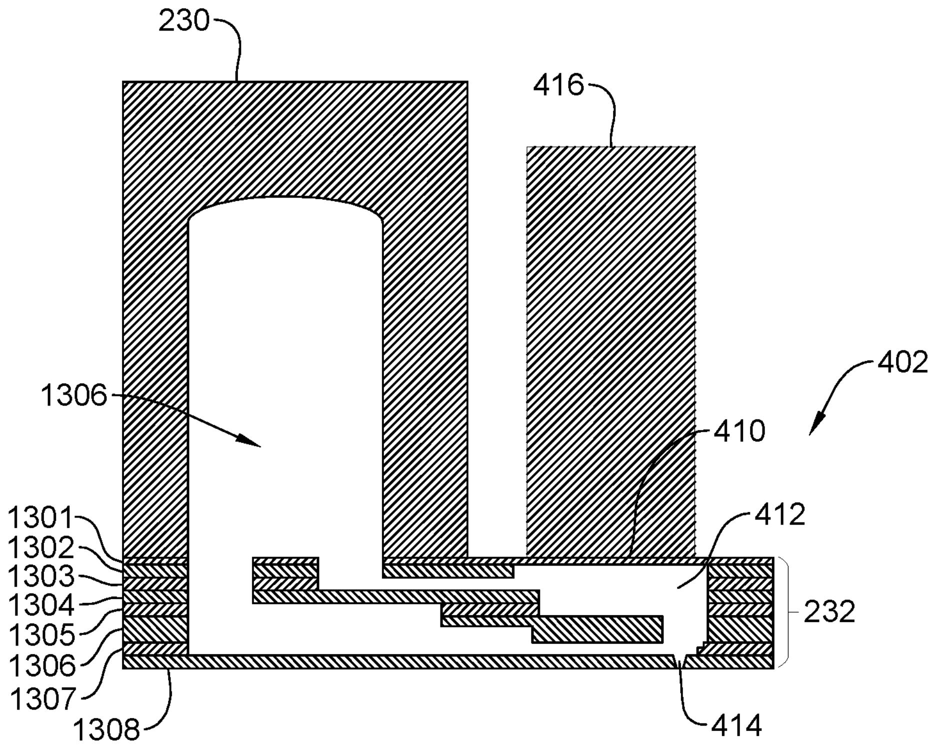
FIGS. 14-15 are cross-sectional views of a portion of a printhead in illustrative embodiments.

FIG. 14 is a cross-sectional view of a portion of a printhead 104 in an illustrative embodiment. FIG. 14 shows a cross-section of printhead 104 along cut-plane 5-5 in FIG. 3. Printhead 104 includes housing 230 and plate stack 232 affixed or attached to housing 230 to form jetting channels 402. As above, plate stack 232 includes diaphragm plate 1301, spacer plate 1302, restrictor plate 1303, chamber plates 1304-1306, restrictor plate 1307, and nozzle plate 1308.

Figure 15:
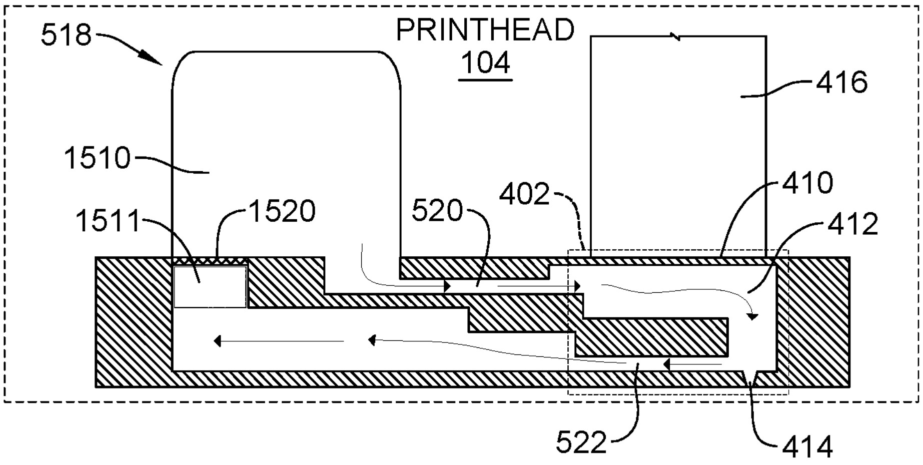

FIGS. 15-18 disclose a printhead 104 in circulation mode in one embodiment. In circulation mode, print fluid may be re-circulated through printhead 104 past each nozzle 414. Circulation mode may also be referred to as re-circulation mode, flow-through mode, etc. FIG. 15 is a cross-sectional view of a portion of printhead 104 in an illustrative embodiment. FIG. 15 shows a cross-section of printhead 104 along cut-plane 5-5 in FIG. 3. In this embodiment, manifold apparatus 518 comprises manifolds 1510-1511. Pressure chamber 412 is fluidly coupled to manifold 1510 through restrictor 520, which controls a flow of print fluid between manifold 1510 and pressure chamber 412 along one fluid path. Pressure chamber 412 is also fluidly coupled to manifold 1511 through restrictor 522, which controls a flow of print fluid between manifold 1511 and pressure chamber 412 along another fluid path.

In this embodiment, manifold apparatus 518 further comprises a flexible separator 1520 installed, implemented, or disposed between manifolds 1510-1511. Flexible separator 1520 comprises a membrane, wall, plate, or another structural element made from a flexible, elastic, or pliable material (e.g., plastic, rubber, thin sheet of metal, etc.) that physically separates manifold 1510 from manifold 1511. In this embodiment, flexible separator 1520 is configured to divide manifold apparatus 518 into manifold 1510 and manifold 1511. Manifolds 1510-1511 are fluidly isolated by flexible separator 1520 along their longitudinal lengths so that print fluid is prevented from flowing directly between manifolds 1510-1511 (although it is noted that manifolds 1510-1511 are fluidly coupled indirectly through the jetting channels 402).

The arrows in FIG. 15 illustrate a flow of print fluid through jetting channel 402. The print fluid flows from manifold 1510 and into pressure chamber 412 through restrictor 520. One wall of pressure chamber 412 is formed with diaphragm 410 that physically interfaces with actuator 416, and vibrates in response to actuation by actuator 416. The print fluid flows through pressure chamber 412 and out of nozzle 414 in the form of a droplet in response to actuation by actuator 416. The print fluid, which is not jetted from nozzle 414, flows from pressure chamber 412 into manifold 1511 through restrictor 522. The print fluid that is not jetted from a nozzle 414 is referred to herein as "non-jetted print fluid". In this scenario, manifold 1510 may be referred to as a supply manifold, as it is configured to supply print fluid to jetting channels 402. Manifold 1511 may be referred to as a return manifold, as it is configured to receive non-jetted print fluid from jetting channels 402. However, the flow of print fluid may be reversed. Thus, either of manifolds 1510-1511 may act as a supply manifold or a return manifold depending the direction of flow of the print fluid. The length of restrictors 520 and 522 may be the same to allow for a reversal of flow in this manner.

Figure 16:
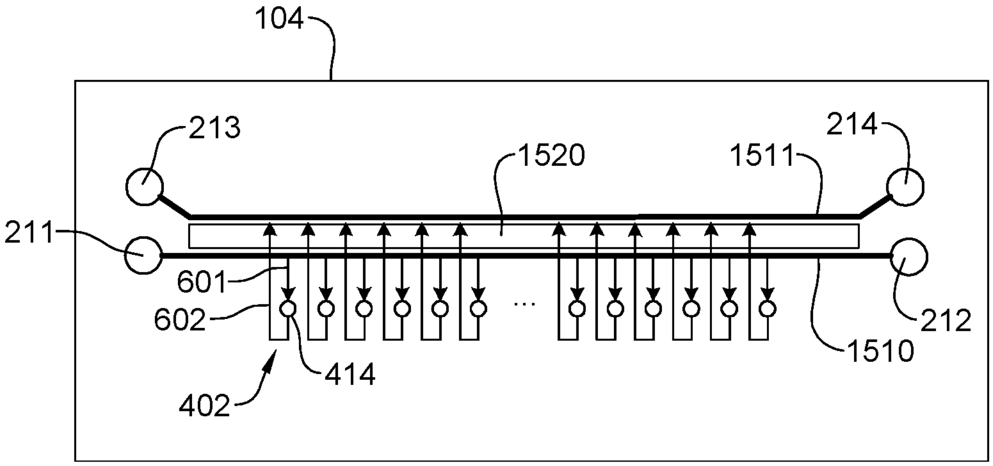
FIG. 16 is a schematic diagram of a printhead in an illustrative embodiment.

FIG. 16 is a schematic diagram of a printhead 104 in an illustrative embodiment. A plurality of jetting channels 402 of printhead 104 is schematically illustrated in FIG. 16 as a row of nozzles 414. Manifold 1510 is disposed between I/O ports 211-212 that define inlets of print fluid into printhead 104. When print fluid enters printhead 104 at one or both of I/O ports 211-212, the print fluid flows through manifold 1510 to jetting channels 402. Manifold 1511 is disposed between I/O ports 213-214 that define outlets of print fluid from printhead 104. Non-jetted print fluid flows from jetting channels 402 through manifold 1511, and exits printhead 104 at one or both of I/O ports 213-214. Although two manifolds 1510-1511 are illustrated in FIG. 16, a printhead 104 may include more manifolds as desired.

For each of the jetting channels 402 illustrated, there is a first fluid path 601 from manifold 1510 to the jetting channel 402, and a second fluid path 602 from the jetting channel 402 to manifold 1511. In the embodiment shown in FIG. 15, for example, the first fluid path 601 from manifold 1510 to jetting channel 402 may be through restrictor 520, which controls the flow of print fluid along the first fluid path 601. Further, the second fluid path 602 from jetting channel 402 to manifold 1511 may be through restrictor 522, which controls the flow of print fluid along the second fluid path 602.

Flexible separator 1520 is disposed between manifold 1510 and manifold 1511. In general, the major portions or sections of manifolds 1510-1511 are disposed longitudinally within printhead 104 to fluidly couple with the jetting channels 402. For example, a row of jetting channels 402 is disposed longitudinally along a length of the printhead 104. Manifolds 1510-1511 may be disposed longitudinally alongside the row of jetting channels 402. Manifolds 1510-1511 may be horizontally aligned within printhead 104, may be vertically aligned within printhead 104, or may have other configurations. In this embodiment, flexible separator 1520 forms a longitudinal wall or divider between manifolds 1510-1511 so that manifolds 1510-1511 are fluidly isolated along their longitudinal lengths.

Figure 17:
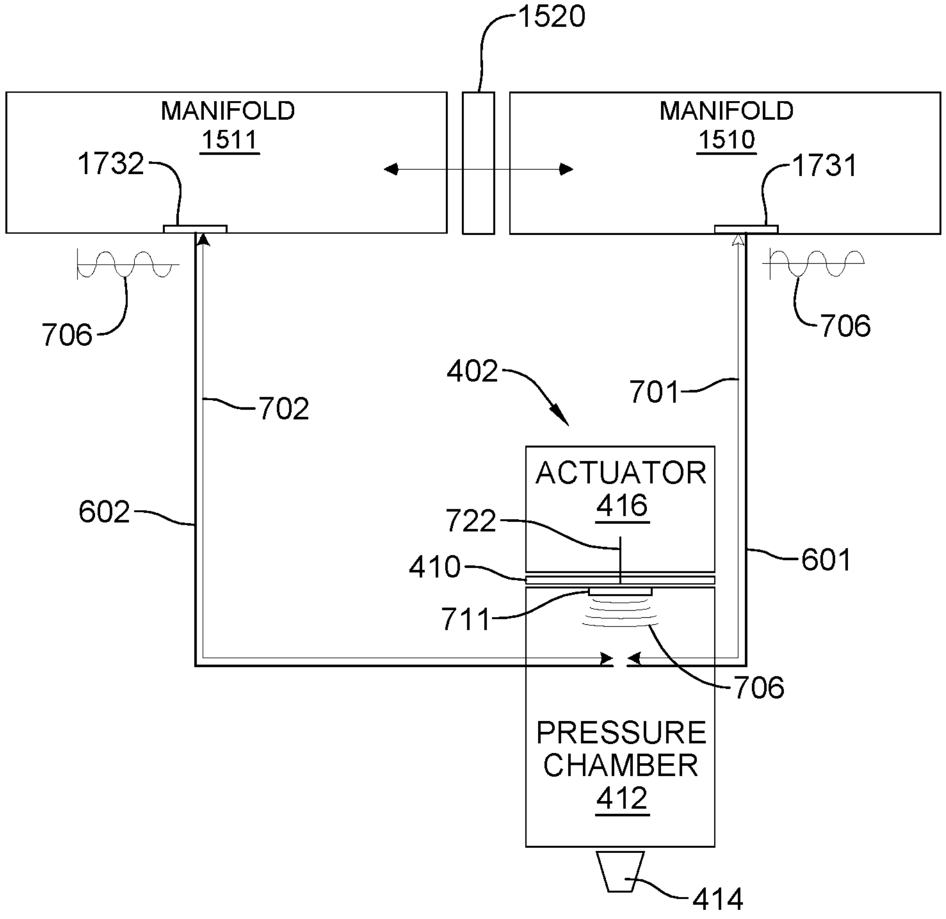
FIG. 17 is a schematic diagram of manifolds and a jetting channel in an illustrative embodiment.

FIG. 17 is a schematic diagram of manifolds 1510-1511 and a jetting channel 402 in an illustrative embodiment. FIG. 17 shows the first fluid path 601 between jetting channel 402 and manifold 1510, and the second fluid path 602 between jetting channel 402 and manifold 1511. In one embodiment, the length 701 of the first fluid path 601 is from an origin 711 of the pressure waves 706 to an opening 1731 of manifold 1510. The length 702 of the second fluid path 602 is from the origin 711 of the pressure waves 706 to an opening 1732 of manifold 1511. As above, the length 701 of the first fluid path 601 is different than the length 702 of the second fluid path 602 by a threshold length. The length 701 of the first fluid path 601 is different than the length 702 of the second fluid path 602 by the threshold length so that the arrival time of pressure waves 706 at manifolds 1510-1511 are not equal and are different by a threshold time. Also shown in FIG. 17 is flexible separator 1520 disposed between manifolds 1510-1511. Due to the compressibility or elasticity of flexible separator 1520, pressure waves 706 are able to communicate between manifolds 1510-1511 through flexible separator 1520. Thus, the pressure waves 706 that arrive at manifold 1510 pass through flexible separator 1520 into manifold 1511, and the pressure waves 706 that arrive at manifold 1511 pass through flexible separator 1520 into manifold 1510. Because the arrival time of pressure waves 706 at manifolds 1510-1511 is different, pressure waves 706 arriving at manifold 1510 interfere destructively with pressure waves 706 arriving at manifold 1511 through flexible separator 1520.

Figure 18:
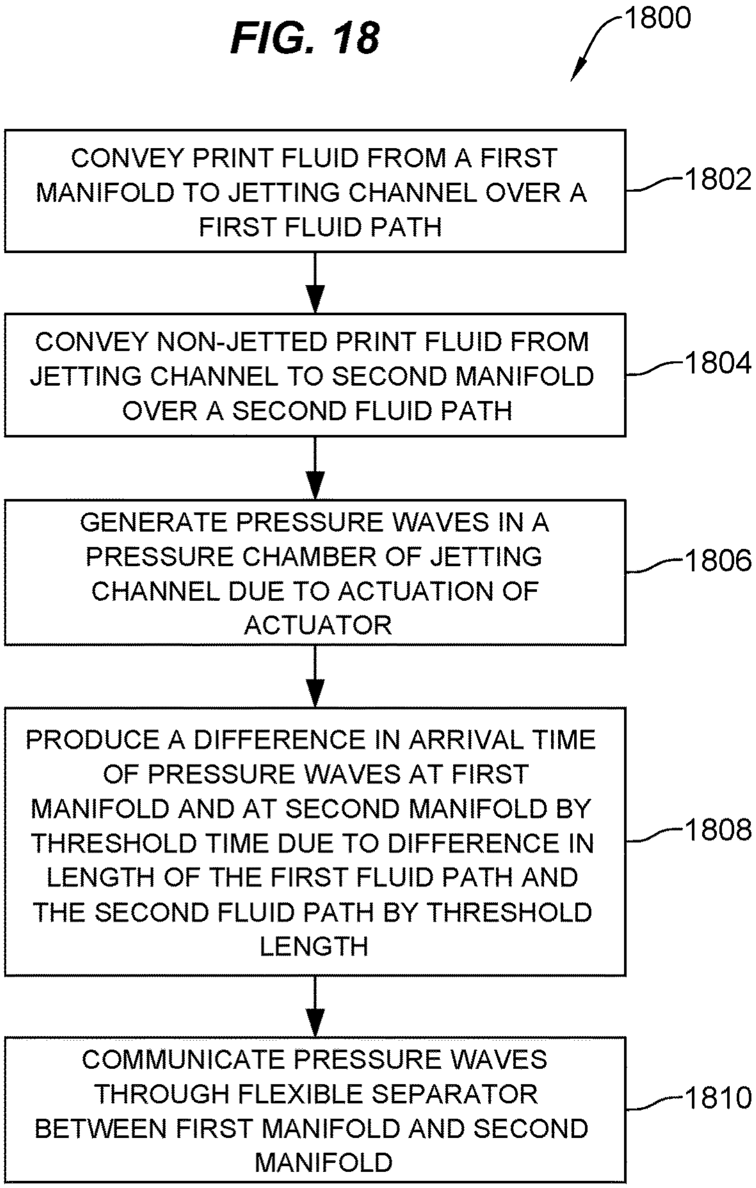
FIG. 18 is a flow chart illustrating a method of operating a printhead in circulation mode in an illustrative embodiment.

FIG. 18 is a flow chart illustrating a method 1800 of operating printhead 104 in circulation mode in an illustrative embodiment. For method 1800, it is assumed that printhead 104 includes a plurality of jetting channels 402 fluidly coupled to manifolds 1510-1511, and that manifolds 1510-1511 are separated with a flexible separator 1520. For each jetting channel 402, a print fluid is conveyed from manifold 1510 to the jetting channel 402 over a first fluid path 601 (step 1802). Non-jetted print fluid is conveyed from the jetting channel 402 to manifold 1511 over a second fluid path 602 (step 1804). Pressure waves 706 are generated in a pressure chamber 412 of the jetting channel 402 due to actuation of an actuator 416 (step 1806), such as to jet droplets of the print fluid from a nozzle 414 of the jetting channel 402. The pressure waves 706 generated in the pressure chamber 412 propagate along the first fluid path 601 to manifold 1510, and propagate along the second fluid path 602 to manifold 1511. The design of printhead 104 produces, creates, or generates a difference in arrival time of pressure waves 706 at manifold 1510 and pressure waves 706 at manifold 1511 by a threshold time due to the difference in length 701 of the first fluid path 601 and the length 702 of the second fluid path 602 by the threshold length (step 1808). Flexible separator 1520 provides pressure wave communication between manifolds 1510-1511 (step 1810). Thus, the pressure waves 706 that arrive at manifold 1510 interfere destructively with the pressure waves 706 that arrive at manifold 1511 due to the communication of the pressure waves 706 through flexible separator 1520.

Figure 19:
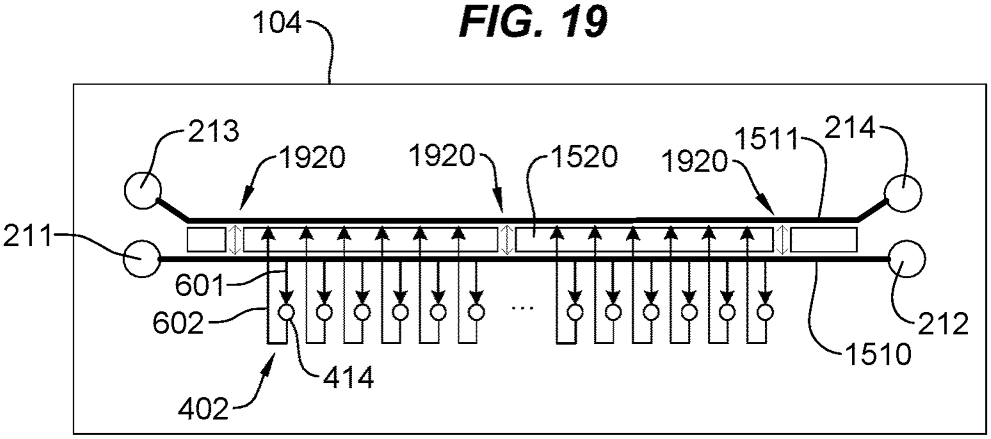
FIGS. 19-27 are schematic diagrams of a printhead in illustrative embodiments.

FIG. 19 is a schematic diagram of a printhead 104 in an illustrative embodiment. FIG. 19 is similar to FIG. 16 in that printhead 104 is schematically illustrated as including manifold 1510 disposed between I/O ports 211-212, manifold 1511 disposed between I/O ports 213-214, and flexible separator 1520 is disposed between manifold 1510 and manifold 1511. Flexible separator 1520 again forms a longitudinal wall or divider between manifolds 1510-1511. In this embodiment, flexible separator 1520 includes one or more bypass holes 1920. A bypass hole 1920 is a hole formed through a wall or divider (e.g., flexible separator 1520) that allows fluid to pass between manifolds 1510-1511. Bypass holes 1920 provide a technical benefit of allowing further pressure wave communication between manifolds 1510-1511 through flexible separator 1520.

Figure 20:
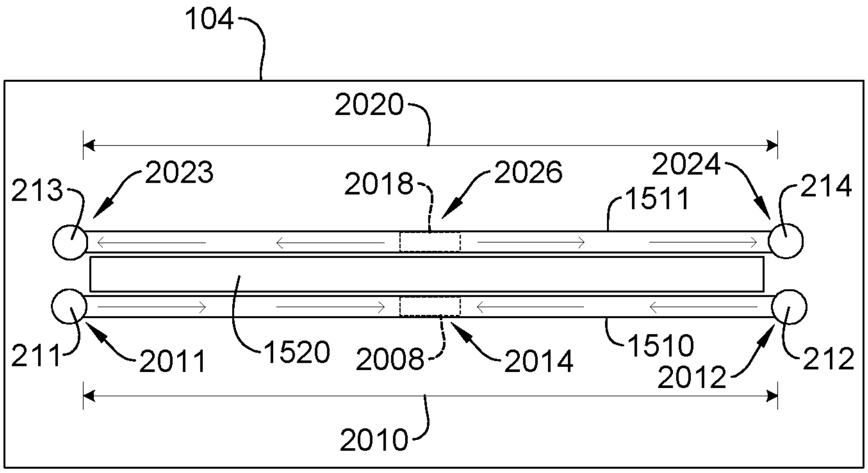

The number and placement of bypass holes 1920 shown in FIG. 19 is just an example, and may vary as desired. FIGS. 20-27 are schematic diagrams of a printhead 104 in an illustrative embodiment. FIGS. 20-23 show various examples of a printhead 104 including manifold 1510 disposed between I/O ports 211-212, manifold 1511 disposed between I/O ports 213-214, and flexible separator 1520 disposed between manifold 1510 and manifold 1511. In FIG. 20, for example, manifold 1510 has a length 2010 between a first end 2011 and a second end 2012. When manifold 1510 has an I/O port 211-212 on ends 2011-2012 respectively, print fluid is able to flow into manifold 1510 from each end 2011-2012. The respective flows from each end 2011-2012 intersect near the center 2014 (i.e., longitudinal center) of manifold 1510, which creates a dead zone 2008 where there is little or no fluid flow. Similarly, manifold 1511 has a length 2020 between a first end 2023 and a second end 2024. When manifold 1511 has an I/O port 213-214 on ends 2023-2024 respectively, print fluid is able to flow out of manifold 1511 from each end 2011-2012. The respective flows from each end 2023-2024 create a dead zone 2018 near the center 2026 (i.e., longitudinal center) where there is little or no fluid flow. This may be an issue as the print fluid could settle or harden at dead zone 2008/2018.

Figure 21:
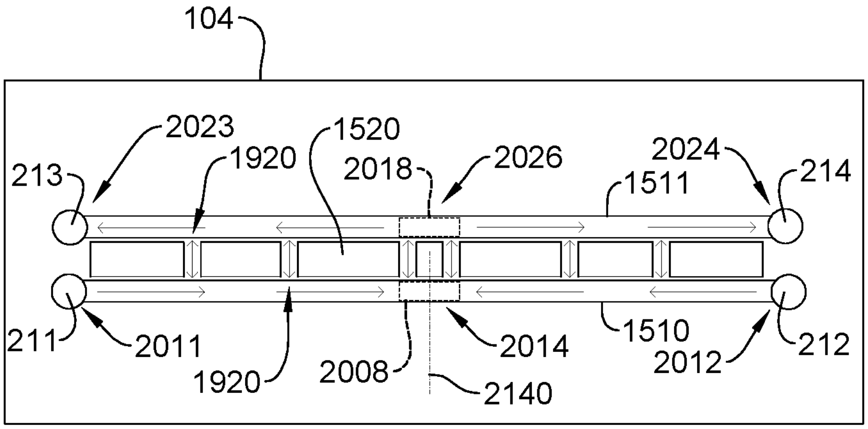

In FIG. 21, one or more bypass holes 1920 are disposed in flexible separator 1520. For example, one or more bypass holes 1920 may be positioned at or near the longitudinal center 2140 of flexible separator 1520 (i.e., at or near the center 2014/2026 of manifolds 1510-1511). In other words, one or more bypass holes 1920 may be disposed or positioned at or near the dead zone 2008/2018 in manifolds 1510-1511, which creates a flow of print fluid between manifolds 1510-1511 at or near the dead zone 2008/2018. This advantageously avoids settling or hardening of print fluid at dead zone 2008/2018.

Figure 22:
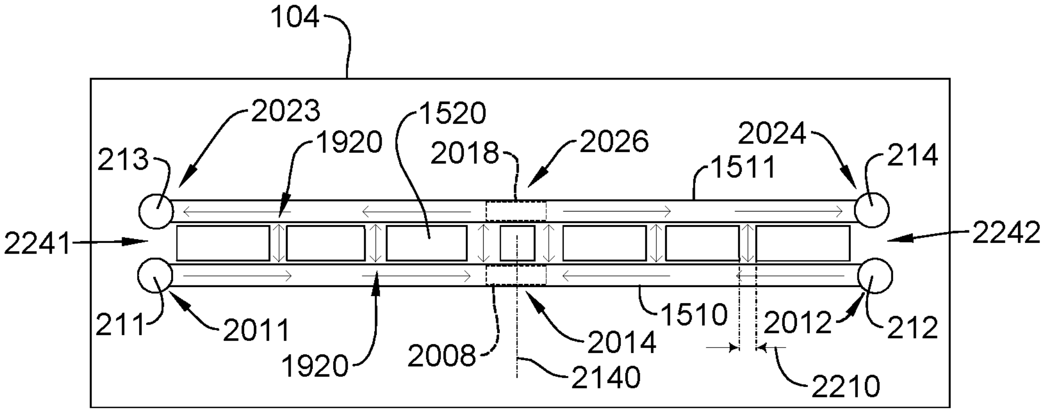
Figure 23:
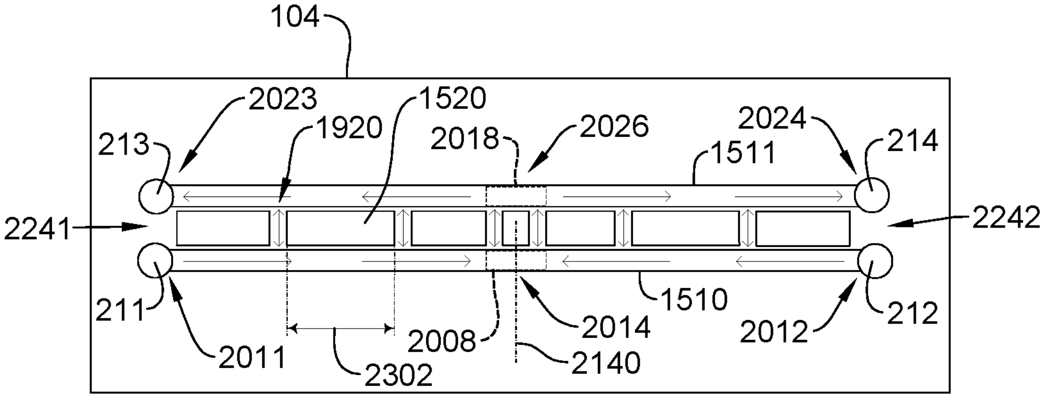

Further, the size, placement, and/or number of bypass holes 1920 may be optimized to create or generate a uniform flow of print fluid between manifolds 1510-1511 along the length 2010/2020 of manifolds 1510-1511. In one embodiment as shown in FIG. 22, the size 2210 (e.g., diameter) of bypass holes 1920 may be optimized to generate a uniform flow of print fluid between manifolds 1510-1511. In one example, the size 2210 of bypass holes 1920 may be larger toward the center 2140 of flexible separator 1520, and may decrease towards ends 2241-2242 of flexible separator 1520. In another example, the size 2210 of bypass holes 1920 may be uniform along the length of flexible separator 1520. In one embodiment as shown in FIG. 23, the placement of bypass holes 1920 may be optimized to generate a uniform flow of print fluid between manifolds 1510-1511. The flow of print fluid in manifold 1510 is greater towards the ends 2011-2012 and is less toward dead zone 2008, and the flow of print fluid in manifold 1511 is greater towards the ends 2023-2024 and is less toward dead zone 2018. In one embodiment, a distance 2302 (i.e., longitudinal distance) between bypass holes 1920 may be shorter toward the center 2140 of flexible separator 1520, and may increase towards ends 2241-2242 of flexible separator 1520. In another example, the distance 2302 between bypass holes 1920 may be uniform along the length of flexible separator 1520.

Figure 24:
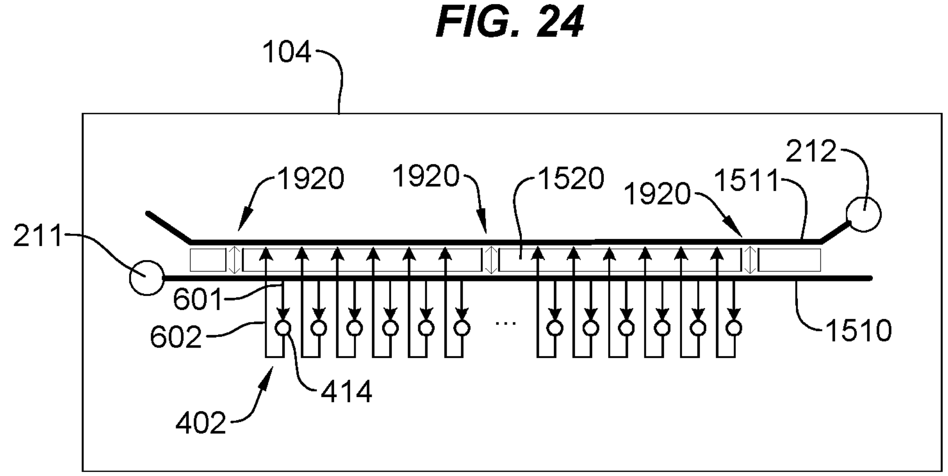

FIG. 24 is a schematic diagram of a printhead 104 in an illustrative embodiment. In this embodiment, manifolds 1510-1511 are each fluidly coupled to a single I/O port. Thus, printhead 104 is schematically illustrated as including manifold 1510 fluidly coupled to I/O port 211, manifold 1511 fluidly coupled to I/O port 212, and flexible separator 1520 disposed between manifold 1510 and manifold 1511. Flexible separator 1520 again forms a longitudinal wall or divider between manifolds 1510-1511, and one or more bypass holes 1920 are formed through flexible separator 1520.

Figure 25:
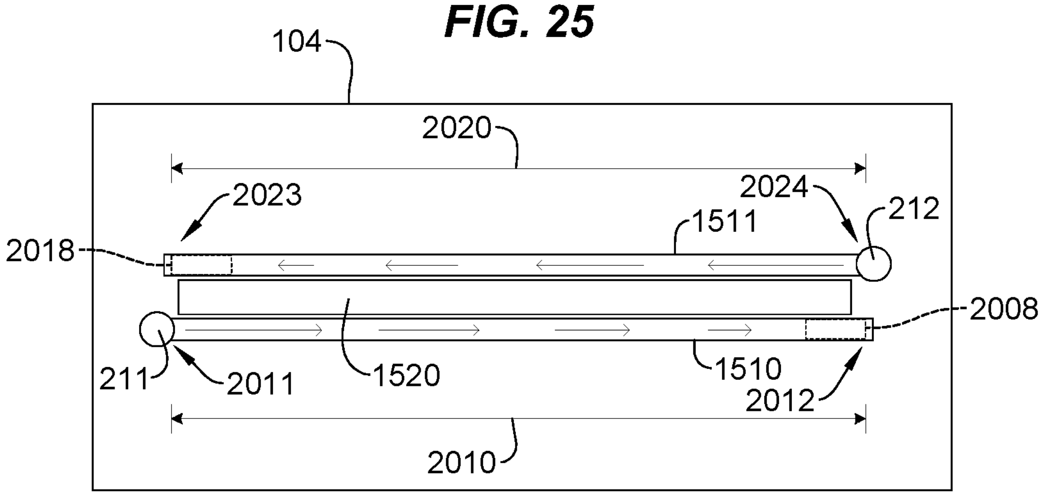
Figure 26:
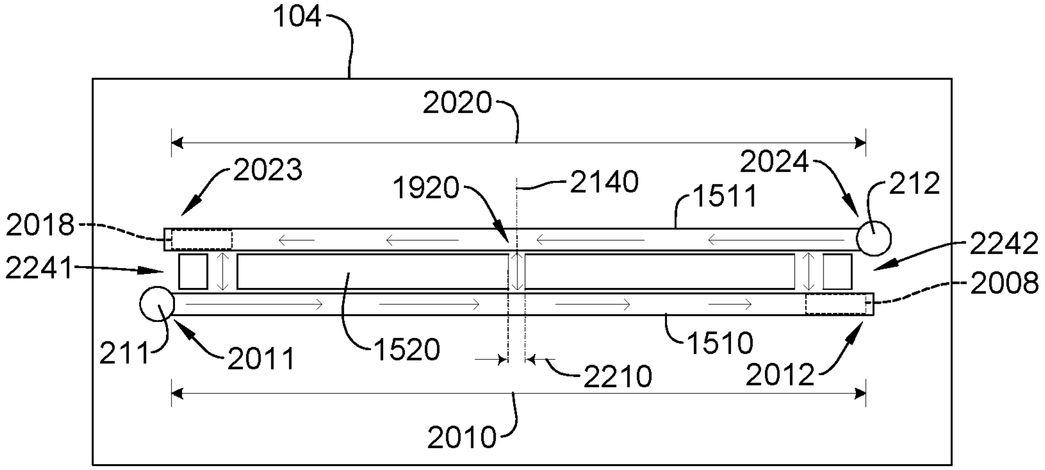
Figure 27:
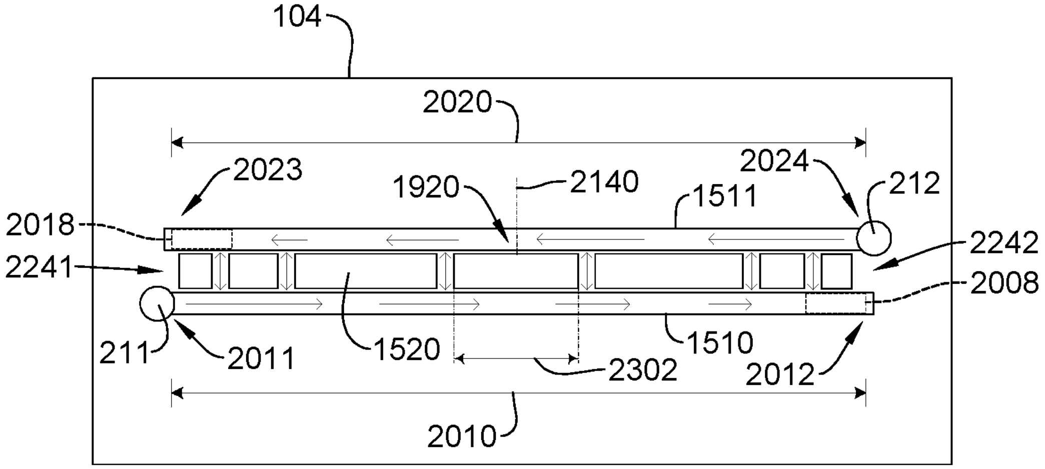

The number and placement of bypass holes 1920 shown in FIG. 24 is just an example, and may vary as desired. FIGS. 25-27 are schematic diagrams of a printhead 104 in an illustrative embodiment. FIGS. 25-27 show various examples of a printhead 104 including manifold 1510 fluidly coupled to I/O port 211, manifold 1511 fluidly coupled to I/O port 212, and flexible separator 1520 disposed between manifold 1510 and manifold 1511. In FIG. 25, for example, manifold 1510 has a length 2010 between a first end 2011 and a second end 2012. When manifold 1510 has an I/O port 211 on end 2011, print fluid is able to flow into manifold 1510 from end 2011 and dead-ends at end 2012. This creates a dead zone 2008 at or near end 2012 where there is little or no fluid flow. Similarly, manifold 1511 has a length 2020 between a first end 2023 and a second end 2024. When manifold 1511 has an I/O port 212 on end 2024, print fluid is able to flow out of manifold 1511 from end 2024, but is dead-ended at end 2023. This creates a dead zone 2018 at or near end 2023 where there is little or no fluid flow. This may be an issue as the print fluid could settle or harden at dead zone 2008/2018.

In FIG. 26, one or more bypass holes 1920 are disposed in flexible separator 1520. For example, bypass holes 1920 may be disposed or positioned at or near the ends 2241-2242 of flexible separator 1520 (i.e., at or near the ends 2012/2023 of manifolds 1510-1511). In other words, the bypass holes 1920 may be disposed at or near the dead zone 2008/2018 in manifolds 1510-1511, which creates a flow of print fluid between manifolds 1510-1511 at or near the dead zone 2008/2018. This advantageously avoids settling or hardening of print fluid at dead zone 2008/2018.

Further, the size, placement, and/or number of bypass holes 1920 may be optimized to create or generate a uniform flow of print fluid between manifolds 1510-1511 along the length 2010/2020 of manifolds 1510-1511. In one embodiment as shown in FIG. 26, the size 2210 (e.g., diameter) of bypass holes 1920 may be optimized to generate a uniform flow of print fluid between manifolds 1510-1511. In one example, the size 2210 of bypass holes 1920 may be larger toward ends 2241-2242 of flexible separator 1520, and may decrease towards the center 2140 of flexible separator 1520. In another example, the size 2210 of bypass holes 1920 may be uniform along the length of flexible separator 1520. In one embodiment as shown in FIG. 27, the placement of bypass holes 1920 may be optimized to generate a uniform flow of print fluid between manifolds 1510-1511. The flow of print fluid in manifold 1510 is greater towards end 2011 and is less toward dead zone 2008, and the flow of print fluid in manifold 1511 is greater towards end 2024 and is less toward dead zone 2018. In one embodiment, a distance 2302 (i.e., longitudinal distance) between bypass holes 1920 may be shorter towards ends 2241-2242 of flexible separator 1520, and may increase toward the center 2140 of flexible separator 1520. In another example, the distance 2302 between bypass holes 1920 may be uniform along the length of flexible separator 1520.

Figure 28:
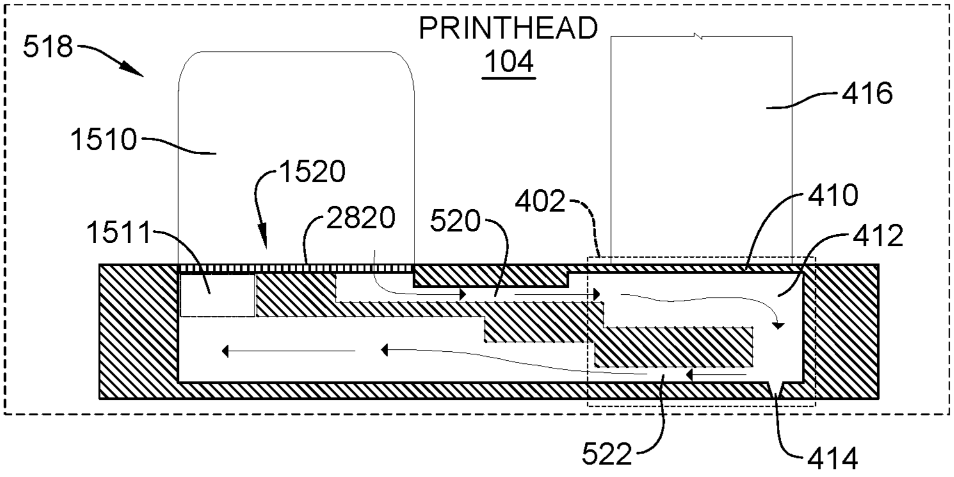
FIG. 28 is a cross-sectional view of a portion of a printhead in an illustrative embodiment.

In one embodiment, the flexible separator 1520 comprising bypass holes 1920 may be a filter. In this embodiment, the size 2210 of the bypass holes 1920 is small enough to capture debris that could clog nozzles 414 or narrow ink passages, and the number of bypass holes 1920 is large enough to allow print fluid to flow to pressure chambers 412 with small flow resistance. FIG. 28 is a cross-sectional view of a portion of printhead 104 in an illustrative embodiment. FIG. 28 shows a cross-section of printhead 104 along cut-plane 5-5 in FIG. 3. As in FIG. 15, manifold apparatus 518 is comprised of manifolds 1510-1511. Pressure chamber 412 is fluidly coupled to manifold 1510 through restrictor 520, which controls a flow of print fluid between manifold 1510 and pressure chamber 412 along one fluid path. Pressure chamber 412 is also fluidly coupled to manifold 1511 through restrictor 522, which controls a flow of print fluid between manifold 1511 and pressure chamber 412 along another fluid path. In this embodiment, flexible separator 1520 comprises a filter 2820 that is installed, implemented, or disposed between manifolds 1510-1511.

Figure 29:
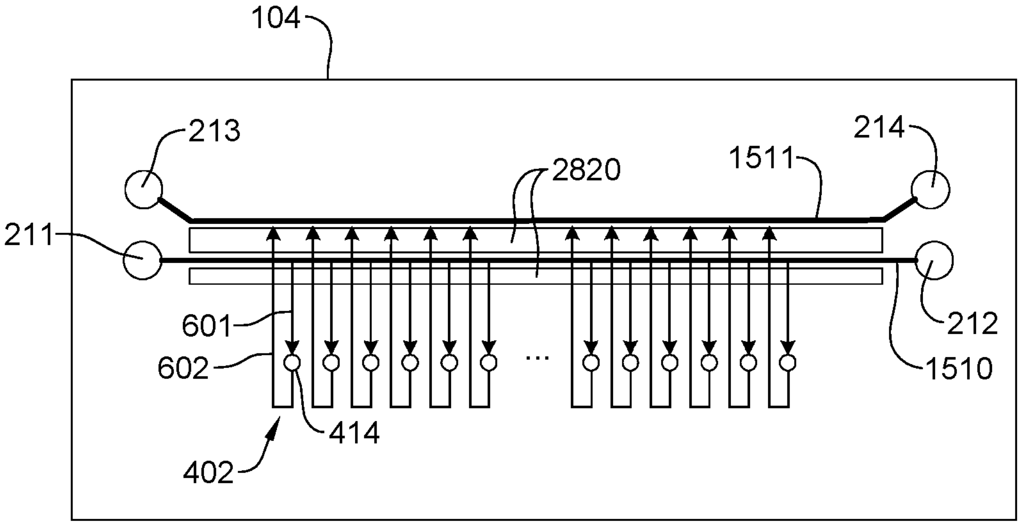
FIG. 29 is a schematic diagram of a printhead in an illustrative embodiment.

FIG. 29 is a schematic diagram of a printhead 104 in an illustrative embodiment. A plurality of jetting channels 402 of printhead 104 is schematically illustrated in FIG. 29 as a row of nozzles 414. Manifold 1510 is disposed between I/O ports 211-212 that define inlets of print fluid into printhead 104. When print fluid enters printhead 104 at one or both of I/O ports 211-212, the print fluid flows through manifold 1510 to jetting channels 402. Manifold 1511 is disposed between I/O ports 213-214 that define outlets of print fluid from printhead 104. Non-jetted print fluid flows from jetting channels 402 through manifold 1511, and exits printhead 104 at one or both of I/O ports 213-214. Although two manifolds 1510-1511 are illustrated in FIG. 29, a printhead 104 may include more manifolds as desired.

For each of the jetting channels 402 illustrated, there is a first fluid path 601 from manifold 1510 to the jetting channel 402, and a second fluid path 602 from the jetting channel 402 to manifold 1511. In the embodiment shown in FIG. 28, for example, the first fluid path 601 from manifold 1510 to jetting channel 402 may be through restrictor 520, which controls the flow of print fluid along the first fluid path 601. Further, the second fluid path 602 from jetting channel 402 to manifold 1511 may be through restrictor 522, which controls the flow of print fluid along the second fluid path 602. Filter 2820 is disposed between manifold 1510 and manifold 1511. Filter 2820 acts to filter the print fluid along the first fluid path 601, and also acts as a flexible separator 1520 between manifold 1510-1511.

Figure 30:
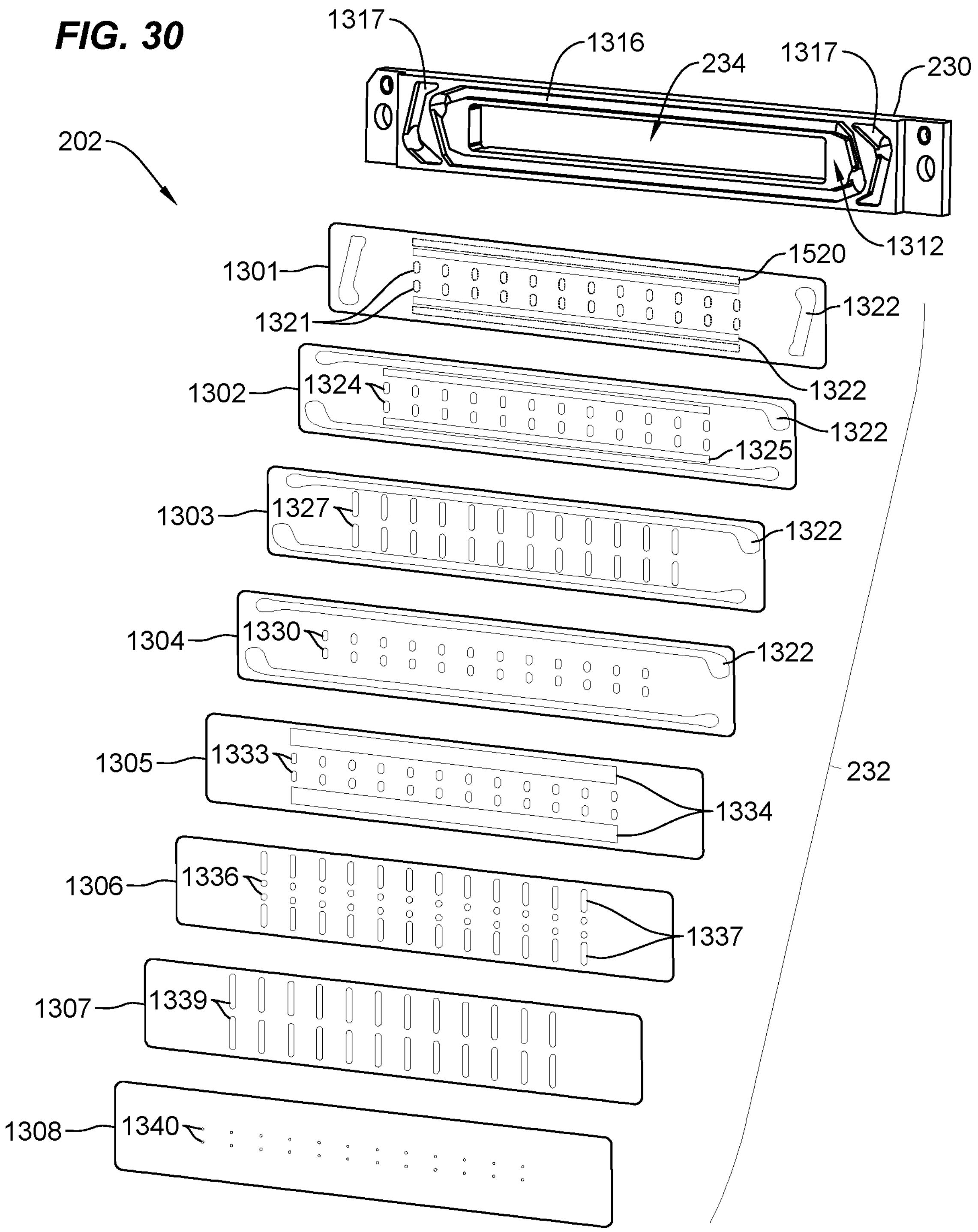
FIG. 30 illustrates an exploded, perspective view of a head member of a printhead in an illustrative embodiment.

FIG. 30 illustrates an exploded, perspective view of a head member 202 of a printhead 104 in an illustrative embodiment. In this embodiment, housing 230 includes manifold ducts 1316-1317 along interface surface 1312. Manifold duct 1316 comprises a groove around access hole 234 that forms part of manifold 1510 (see FIG. 15). The major portions of manifold duct 1316 are disposed longitudinally along interface surface 1312. Manifold duct 1317 comprises grooves toward short ends of housing 230 that form part of manifold 1511. As before, plate stack 232 includes the following plates: diaphragm plate 1301, spacer plate 1302, restrictor plate 1303, chamber plates 1304-1306, restrictor plate 1307, and nozzle plate 1308. The structure of the plates may be similar to FIG. 13. However, in this embodiment, diaphragm plate 1301 includes diaphragms 1321, manifold openings 1322, and flexible separator 1520. Spacer plate 1302, restrictor plate 1303, and chamber plate 1304 may also include manifold openings 1322 that form part of manifold 1511.

Figure 31:
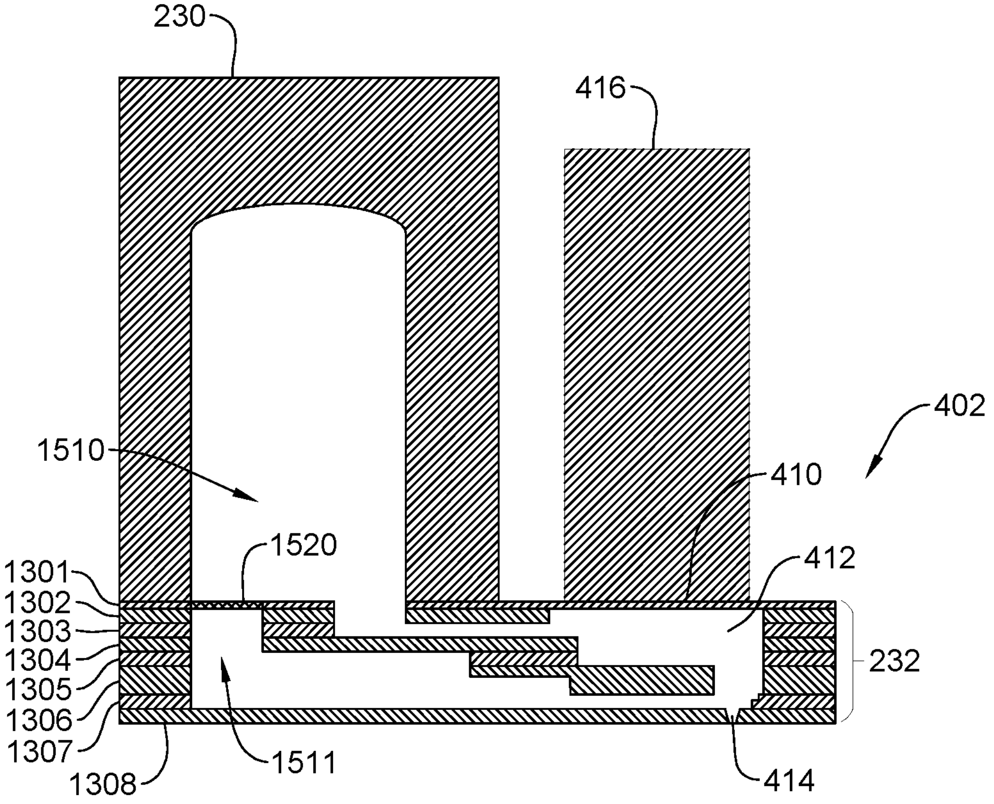
FIG. 31 is a cross-sectional view of a portion of a printhead in an illustrative embodiment.

FIG. 31 is a cross-sectional view of a portion of a printhead 104 in an illustrative embodiment. FIG. 31 shows a cross-section of printhead 104 along cut-plane 5-5 in FIG. 3. Printhead 104 includes housing 230 and plate stack 232 affixed or attached to housing 230 to form jetting channels 402. As above, plate stack 232 includes diaphragm plate 1301, spacer plate 1302, restrictor plate 1303, chamber plates 1304-1306, restrictor plate 1307, and nozzle plate 1308. In one embodiment, flexible separator 1520 in diaphragm plate 1301 physically separates manifold 1510 from manifold 1511 so that manifolds 1510-1511 are fluidly isolated by flexible separator 1520 along their longitudinal lengths and print fluid is prevented from flowing directly between manifolds 1510-1511 (although it is noted that manifolds 1510-1511 are fluidly coupled indirectly through the jetting channels 402). In one embodiment, flexible separator 1520 includes one or more bypass holes 1920 (see FIG. 19) that allow fluid to pass between manifolds 1510-1511. Although shown as part of diaphragm plate 1301 in this embodiment, flexible separator 1520 is implemented in other plates in other embodiments.

Figure 32:
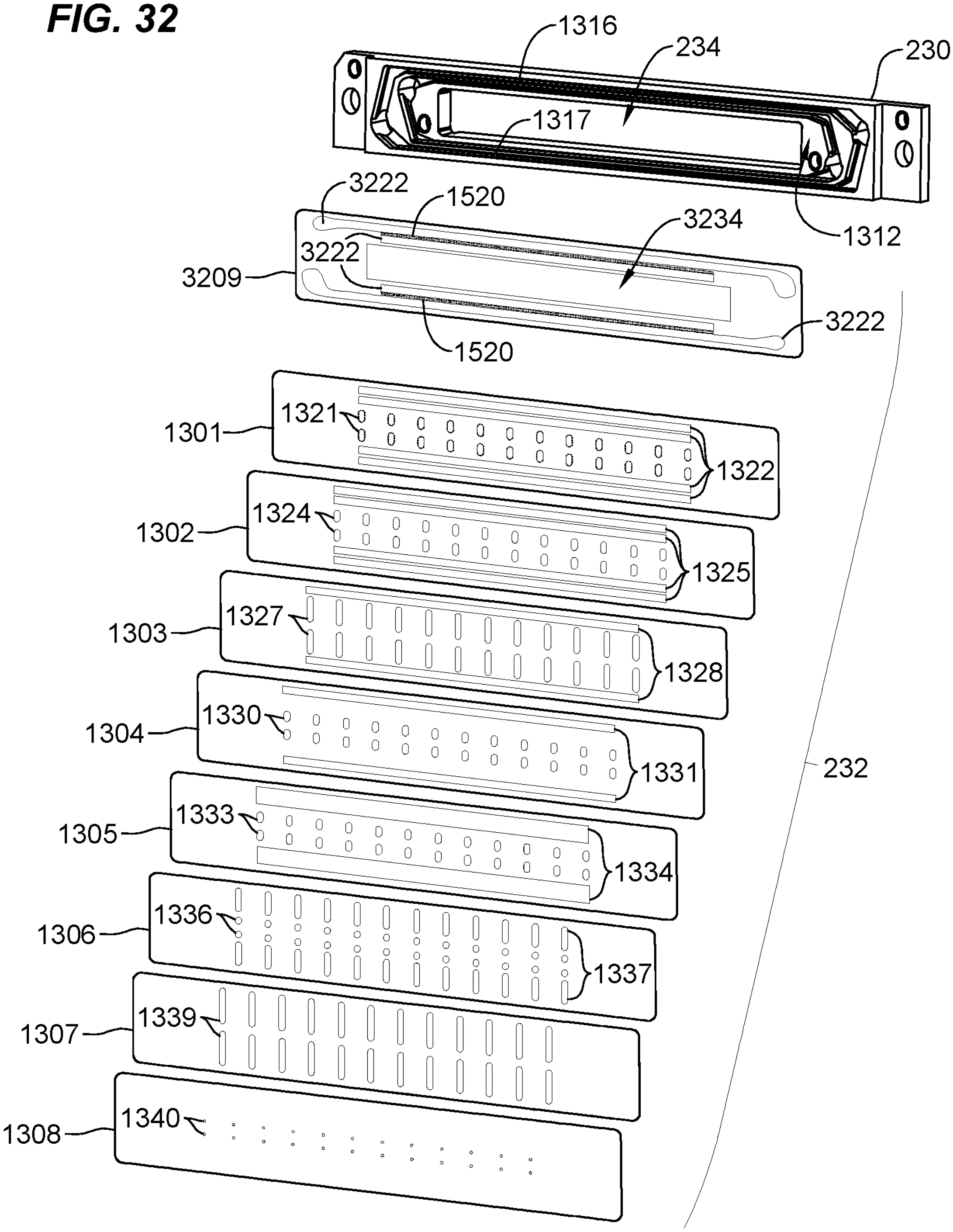
FIG. 32 illustrates an exploded, perspective view of a head member of a printhead in an illustrative embodiment.

FIG. 32 illustrates an exploded, perspective view of a head member 202 of a printhead 104 in an illustrative embodiment. In this embodiment, housing 230 includes manifold ducts 1316-1317 along interface surface 1312. Manifold duct 1316 comprises a groove around access hole 234 that forms part of manifold 1510 (see FIG. 15). The major portions of manifold duct 1316 are disposed longitudinally along interface surface 1312. Manifold duct 1317 comprises a groove around manifold duct 1316 that forms part of manifold 1511. The major portions of manifold duct 1317 are disposed longitudinally along interface surface 1312. As before, plate stack 232 includes the following plates: diaphragm plate 1301, spacer plate 1302, restrictor plate 1303, chamber plates 1304-1306, restrictor plate 1307, and nozzle plate 1308. The structure of the plates may be similar to FIG. 13. However, in this embodiment, plate stack further includes one or more manifold plates 3209. A manifold plate 3209 includes access hole 3234 that corresponds with access hole 234 of housing 230 to provide a passageway for electronics 204, and manifold openings 3222. Manifold plate 3209 also includes flexible separator 1520 between manifold openings 3222.

Figure 33:
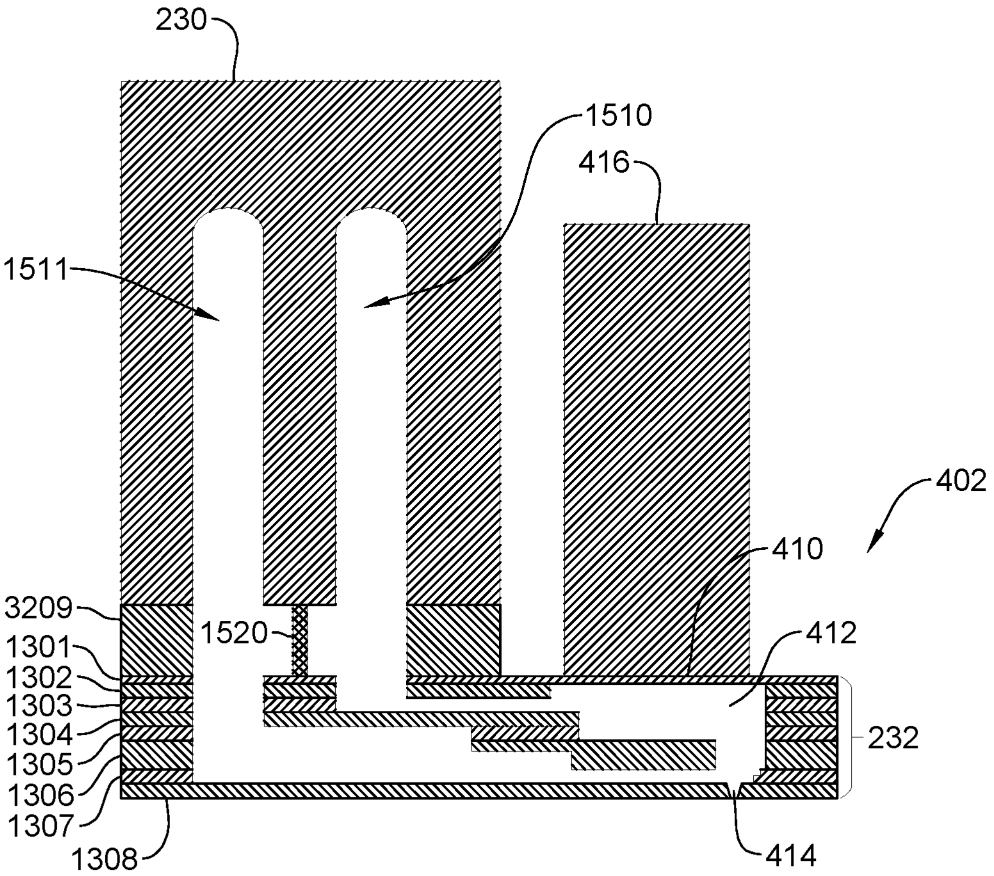
FIG. 33 is a cross-sectional view of a portion of a printhead in an illustrative embodiment.

FIG. 33 is a cross-sectional view of a portion of a printhead 104 in an illustrative embodiment. FIG. 33 shows a cross-section of printhead 104 along cut-plane 5-5 in FIG. 3. Printhead 104 includes housing 230 and plate stack 232 affixed or attached to housing 230 to form jetting channels 402. As above, plate stack 232 includes manifold plate 3209, diaphragm plate 1301, spacer plate 1302, restrictor plate 1303, chamber plates 1304-1306, restrictor plate 1307, and nozzle plate 1308. In this embodiment, flexible separator 1520 in manifold plate 3209 physically separates manifold 1510 from manifold 1511 so that manifolds 1510-1511 are fluidly isolated by flexible separator 1520 along their longitudinal lengths and print fluid is prevented from flowing directly between manifolds 1510-1511 (although it is noted that manifolds 1510-1511 are fluidly coupled indirectly through the jetting channels 402). In one embodiment, flexible separator 1520 includes one or more bypass holes 1920 (see FIG. 19) that allow fluid to pass between manifolds 1510-1511. Although shown as part of manifold plate 3209 in this embodiment, flexible separator 1520 is implemented in other plates in other embodiments.

Figure 34:
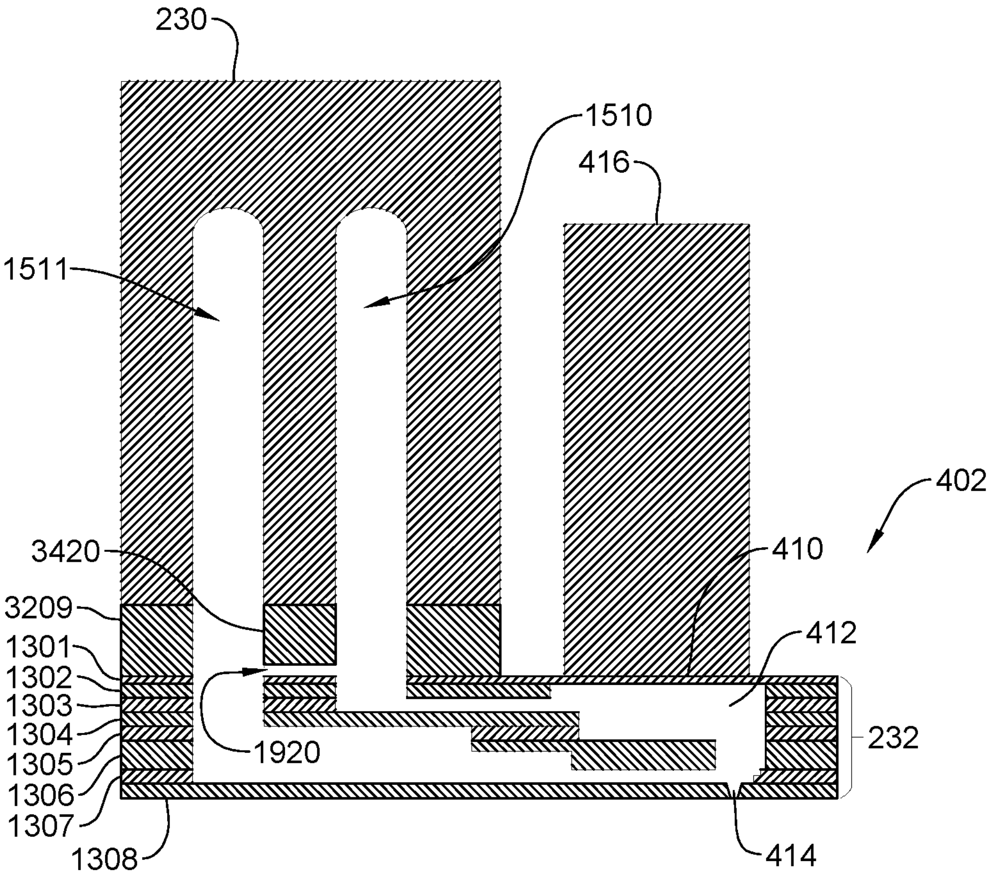
FIG. 34 is a cross-sectional view of a portion of a printhead in an illustrative embodiment.

In one embodiment, a rigid separator may be implemented, such as in manifold plate 3209, to physically separate manifold 1510 from manifold 1511. FIG. 34 is a cross-sectional view of a portion of a printhead 104 in an illustrative embodiment. Printhead 104 includes housing 230 and plate stack 232 affixed or attached to housing 230 to form jetting channels 402. As above, plate stack 232 includes manifold plate 3209, diaphragm plate 1301, spacer plate 1302, restrictor plate 1303, chamber plates 1304-1306, restrictor plate 1307, and nozzle plate 1308. In this embodiment, a rigid separator 3420 in manifold plate 3209 physically separates manifold 1510 from manifold 1511. Rigid separator 3420 includes one or more bypass holes 1920 that allow fluid to pass between manifolds 1510-1511.

Figure 35:
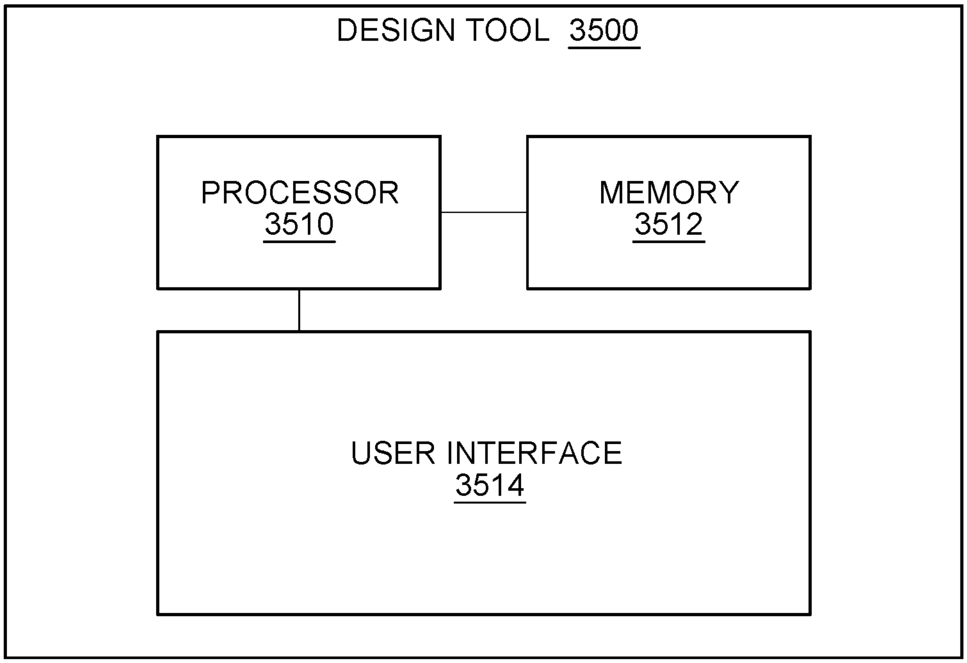
FIG. 35 is a schematic diagram of a design tool for a printhead in an illustrative embodiment.

FIG. 35 is a schematic diagram of a design tool 3500 for a printhead 104 in an illustrative embodiment. Design tool 3500 is an apparatus or device configured to assist in the design of a printhead, such as printhead 104. More particularly, design tool 3500 may be configured to determine one or more dimensions of components in a printhead 104, although design tool 3500 may be configured to determine other design aspects of a printhead 104. Design tool 3500 includes a hardware platform that includes a processor 3510 and memory 3512. Processor 3510 comprises an integrated hardware circuit configured to execute instructions stored in memory 3512. Memory 3512 is a non-transitory computer readable storage medium for data, instructions, etc., and is accessible by processor 3510. Design tool 3500 may further include a user interface 3514. User interface 3514 is a hardware component for interacting with an end user. For example, user interface 3514 may include a display, screen, touch screen, or the like (e.g., a Liquid Crystal Display (LCD), a Light Emitting Diode (LED) display, etc.). User interface 3514 may include a keyboard or keypad, a tracking device (e.g., a trackball or trackpad), a speaker, a microphone, etc. Design tool 3500 may include various other components not specifically illustrated in FIG. 35.

Figure 36:
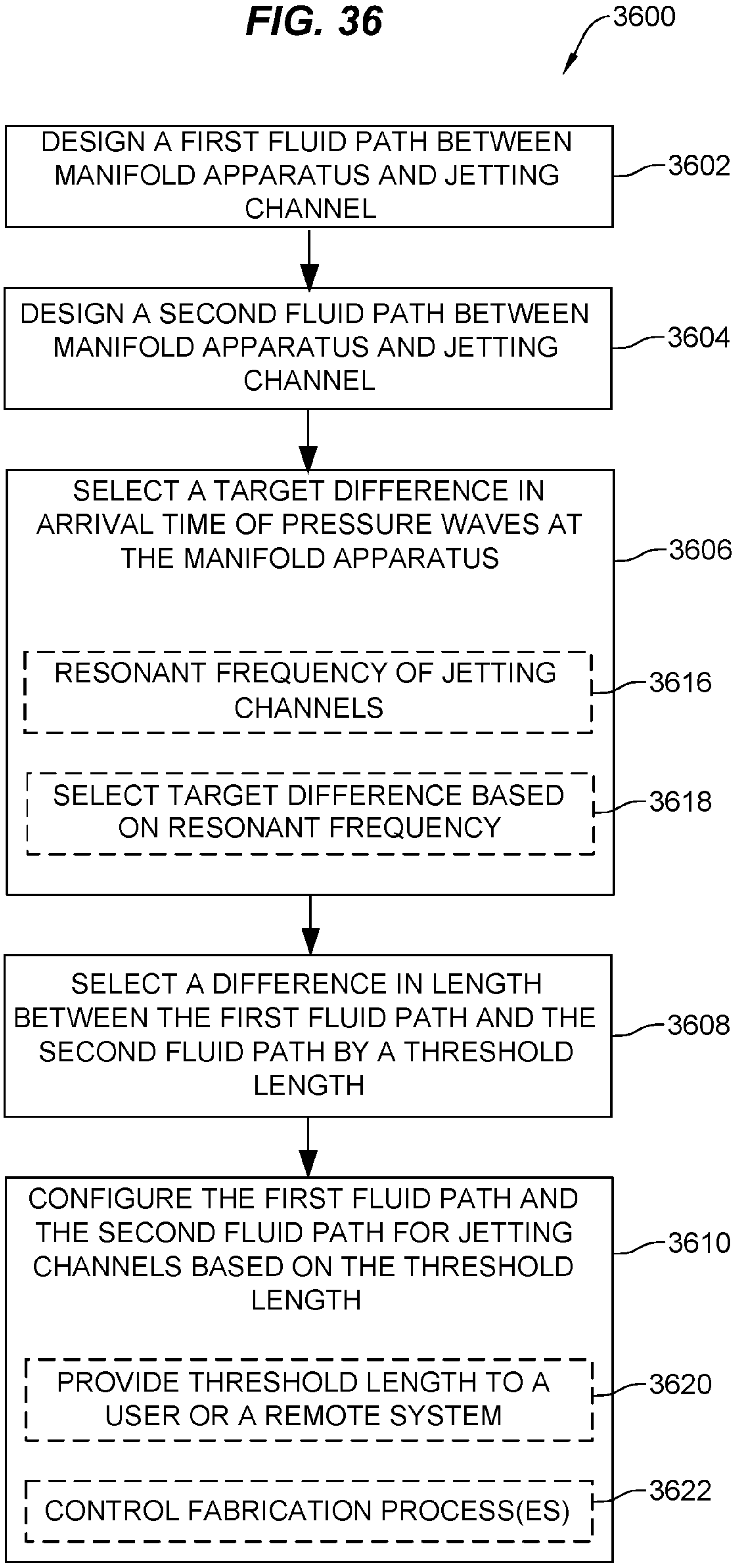
FIG. 36 is a flow chart illustrating a method of designing a printhead in an illustrative embodiment.

FIG. 36 is a flow chart illustrating a method 3600 of designing a printhead 104 in an illustrative embodiment. The steps of method 3600 will be described with reference to design tool 3500 in FIG. 35, but those skilled in the art will appreciate that method 3600 may be performed by other systems, tools, or entities. It is assumed for this embodiment that a printhead 104 includes or will include a manifold apparatus 518 having one or more manifolds 1510-1511, and that manifold apparatus 518 is fluidly coupled to a plurality of jetting channels 402. Processor 3510 plans, models, or designs a first fluid path 601 between the manifold apparatus 518 and a jetting channel 402 (step 3602), and a second fluid path 602 between the manifold apparatus 518 and the jetting channel 402 (step 3604). When the jetting channel 402 is in operation, pressure waves 706 are generated in a pressure chamber 412 of the jetting channel 402 due to actuation of an actuator 416, such as to jet droplets of the print fluid from a nozzle 414 of the jetting channel 402. The pressure waves 706 generated in the pressure chamber 412 will propagate along the first fluid path 601 to manifold apparatus 518, and propagate along the second fluid path 602 to manifold apparatus 518. Processor 3510 selects, calculates, or identifies a target difference in arrival time of the pressure waves 706 at manifold apparatus 518 (step 3606). Processor 3510 selects a difference in length between the first fluid path 601 and the second fluid path 602 by a threshold length that causes the target difference in arrival time of the pressure waves 706 at manifold apparatus 518 (step 3608). The difference in length 701 of the first fluid path 601 and length 702 of the second fluid path 602 by the threshold length will cause a difference in arrival time of pressure waves 706 at manifold apparatus 518 (i.e., by a threshold time). Processor 3510 may then configure the first fluid path 601 and the second fluid path 602 for the jetting channels 402 based on the threshold length (step 3610). In one embodiment, processor 3510 may display or otherwise provide the threshold length (optional step 3620) to a user through user interface 3514, over a network to a remote system, or perform other functions when selecting the target length. In one embodiment, processor 3510 may control, regulate, set, or instruct one or more fabrication processes to fabricate the printhead 104 based on the threshold length between the fluid paths 601-602 (optional step 3622).

In one embodiment, processor 3510 may determine the resonant frequency or Helmholtz frequency of the jetting channels 402 (optional step 3616), and select the target difference in arrival time of the pressure waves 706 at manifold apparatus 518 based on the resonant frequency (optional step 3618). For example, processor 3510 may perform a test on printhead 104 or a similar printhead (i.e., another printhead with jetting channels having the same or similar dimensions), or may receive test data regarding the printhead 104 or a similar printhead to determine the resonant frequency of the jetting channels 402. Processor 3510 may perform a simulation on printhead 104 or a similar printhead, or may receive simulation data regarding the printhead 104 or a similar printhead to determine the resonant frequency of the jetting channels 402. Processor 3510 may determine the resonant frequency of jetting channels 402 in other ways. Processor 3510 may then select the target difference in arrival time and/or threshold length based on the resonant frequency of the jetting channels 402. For example, the target difference in arrival time may be a half resonant cycle (e.g., 0.5) or half Helmholtz cycle of the jetting channels 402, or a multiple of the half resonant cycle (e.g., 1.5, 2.5, 3.5, etc.).

Figure 37:
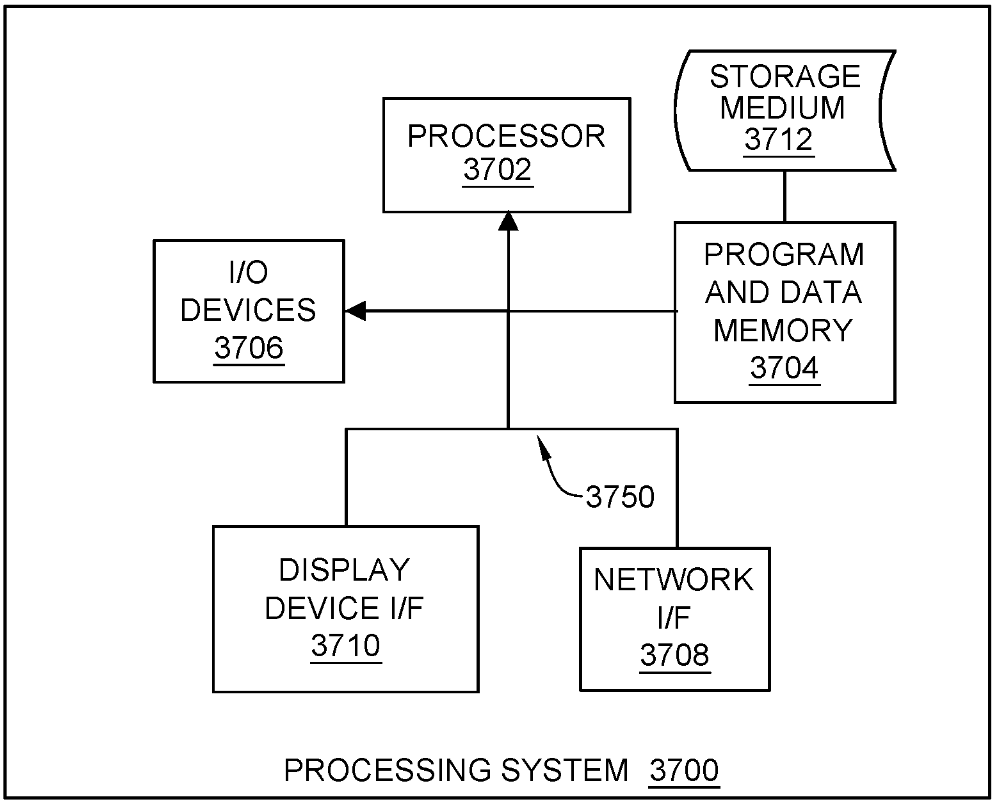
FIG. 37 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of design tool 3500 to perform the various operations disclosed herein. FIG. 37 illustrates a processing system 3700 operable to execute a computer readable medium embodying programmed instructions to perform desired functions in an illustrative embodiment. Processing system 3700 is operable to perform the above operations by executing programmed instructions tangibly embodied on computer readable storage medium 3712. In this regard, embodiments can take the form of a computer program accessible via computer-readable medium 3712 providing program code for use by a computer or any other instruction execution system. For the purposes of this description, computer readable storage medium 3712 can be anything that can contain or store the program for use by the computer.

Computer readable storage medium 3712 can be an electronic, magnetic, optical, electromagnetic, infrared, or semiconductor device. Examples of computer readable storage medium 3712 include a solid-state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 3700, being suitable for storing and/or executing the program code, includes at least one processor 3702 coupled to program and data memory 3704 through a system bus 3750. Program and data memory 3704 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 3706 (including but not limited to keyboards, displays, pointing devices, etc.) can be coupled either directly or through intervening I/O controllers. Network adapter interfaces 3708 may also be integrated with the system to enable processing system 3700 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 3710 may be integrated with the system to interface to one or more display devices, such as printing systems and screens for presentation of data generated by processor 3702.

Although specific embodiments were described herein, the scope of the invention is not limited to those specific embodiments. The scope of the invention is defined by the following claims and any equivalents thereof.

What is claimed is:

1. A printhead comprising:

a manifold apparatus comprising a first manifold, a second manifold, and a flexible separator disposed between the first manifold and the second manifold; and a plurality of jetting channels each fluidly coupled to the first manifold via a first fluid path and to the second manifold via a second fluid path;

wherein when pressure waves generated in pressure chambers of the jetting channels propagate along the first fluid path and the second fluid path, the pressure waves communicate between the first manifold and the second manifold through the flexible separator;

wherein a design of the first fluid path and the second fluid path causes a difference in arrival time of the pressure waves at the manifold apparatus to produce destructive interference of the pressure waves at the manifold apparatus.

2. The printhead of claim 1 wherein:

the design comprises lengths of the first fluid path and the second fluid path differing by a threshold length so that the arrival time of the pressure waves at the manifold apparatus are different by a threshold time.

3. The printhead of claim 2 wherein:

the threshold time is based on a resonant frequency of the jetting channels.

4. The printhead of claim 3 wherein:

the threshold time is approximately a half resonant cycle or a multiple of the half resonant cycle.

5. The printhead of claim 1 wherein:

the design comprises material properties of the printhead that form the first fluid path and the second fluid path differing so that the arrival time of the pressure waves at the manifold apparatus are different.

6. The printhead of claim 1 wherein:

the design comprises a volume of the first fluid path and the second fluid path differing so that the arrival time of the pressure waves at the manifold apparatus are different.

7. The printhead of claim 1 wherein:

the flexible separator fluidly isolates the first manifold and the second manifold.

8. The printhead of claim 1, wherein:

the flexible separator comprises one or more bypass holes that fluidly couple the first manifold and the second manifold.

9. The printhead of claim 8 wherein:

a size of the bypass holes is larger toward a longitudinal center of the flexible separator, and decreases towards ends of the flexible separator.

10. The printhead of claim 8 wherein:

a distance between the bypass holes is shorter toward a longitudinal center of the flexible separator, and increases towards ends of the flexible separator.

11. The printhead of claim 8 further comprising:

a single Inlet/Outlet (I/O) port fluidly coupled to the first manifold; and a single I/O port fluidly coupled to the second manifold;

wherein the bypass holes are disposed near ends of the flexible separator.

12. The printhead of claim 8 further comprising:

a single Inlet/Outlet (I/O) port fluidly coupled to the first manifold; and a single I/O port fluidly coupled to the second manifold;

wherein a size of the bypass holes is larger toward ends of the flexible separator, and decreases towards a longitudinal center of the flexible separator.

13. The printhead of claim 8 further comprising:

a single Inlet/Outlet (I/O) port fluidly coupled to the first manifold; and a single I/O port fluidly coupled to the second manifold;

wherein a distance between the bypass holes is shorter toward ends of the flexible separator, and increases towards a longitudinal center of the flexible separator.

14. A jetting apparatus comprising:

at least one printhead of claim 1.

15. A method of operating a printhead comprising a plurality of jetting channels configured to jet a print fluid, the method comprising:

for each jetting channel of the plurality, conveying the print fluid from a first manifold of a manifold apparatus to the jetting channel over a first fluid path; and conveying non-jetted print fluid from the jetting channel to a second manifold of the manifold apparatus over a second fluid path;

generating pressure waves in a pressure chamber of the jetting channel that propagate along the first fluid path and the second fluid path; and communicating the pressure waves between the first manifold and the second manifold through a flexible separator disposed between the first manifold and the second manifold;

wherein a design of the first fluid path and the second fluid path causes a difference in arrival time of the pressure waves at the manifold apparatus to produce destructive interference of the pressure waves at the manifold apparatus.

16. The method of claim 15 further comprising:

the design producing a difference in the arrival time of the pressure waves at the manifold apparatus by a threshold time due to a difference in length between the first fluid path and the second fluid path by a threshold length.

17. The method of claim 16 wherein:

the threshold time is based on a resonant frequency of the jetting channels.

18. The method of claim 17 wherein:

the threshold time is approximately a half resonant cycle or a multiple of the half resonant cycle.

19. A printhead comprising:

a manifold apparatus comprising a first manifold, a second manifold, and a separator that separates the first manifold and the second manifold, wherein the separator is flexible to communicate pressure waves between the first manifold and the second manifold; and a plurality of jetting channels each fluidly coupled to the first manifold via a first fluid path and to the second manifold via a second fluid path;

wherein when the pressure waves generated in pressure chambers of the jetting channels propagate along the first fluid path and the second fluid path, features of the first fluid path and the second fluid path cause a difference in arrival time of the pressure waves at the manifold apparatus to produce destructive interference of the pressure waves at the manifold apparatus.

20. The printhead of claim 19 wherein:

lengths of the first fluid path and the second fluid path are different by a threshold length so that the arrival time of the pressure waves at the manifold apparatus are different by a threshold time.

21. A jetting apparatus comprising:

at least one printhead of claim 19.

* * * * *